(12) United States Patent
Onogi

(10) Patent No.: US 6,383,102 B1
(45) Date of Patent: May 7, 2002

(54) BELT PRESSING MECHANISM FOR CONTINUOUSLY VARIABLE TRANSMISSION

(75) Inventor: Kenkichi Onogi, Tokyo (JP)

(73) Assignee: Tokyo Automatic Machinery Co., Ltd., Tokyo (JP)

( * ) Notice: Subject to any disclaimer, the term of this patent is extended or adjusted under 35 U.S.C. 154(b) by 14 days.

(21) Appl. No.: 09/618,297

(22) Filed: Jul. 18, 2000

(30) Foreign Application Priority Data

Jul. 21, 1999 (JP) .......................................... 11-235891

(51) Int. Cl.[7] .......................... F16H 55/56; F16H 59/00
(52) U.S. Cl. .............................. 474/46; 474/30; 474/18; 474/23
(58) Field of Search ................................ 474/8, 23, 70, 474/69, 18, 28, 17, 72, 93, 37, 171, 46, 30, 29, 39, 43, 45

(56) References Cited

U.S. PATENT DOCUMENTS

| | | | |
|---|---|---|---|
| 2,170,212 A | * 8/1939 | Pfleger | 474/46 X |
| 2,205,975 A | * 6/1940 | Heyer | 474/29 |
| 2,852,951 A | * 9/1958 | Miner | 474/23 |
| 3,516,296 A | * 6/1970 | Detwiler | 474/23 |
| 4,016,773 A | 4/1977 | Galas et al. | |
| 4,018,319 A | 4/1977 | Thomas | |
| 4,252,751 A | 2/1981 | Shito | |
| 4,900,296 A | 2/1990 | Schmidt | |
| 4,973,288 A | * 11/1990 | Sakakibara et al. | 474/28 X |
| 5,334,103 A | 8/1994 | Gryspeerdt | |
| 5,567,094 A | 10/1996 | Chung | |
| 6,120,400 A | * 9/2000 | Onogi | 474/46 |

FOREIGN PATENT DOCUMENTS

| | | | |
|---|---|---|---|
| JP | 58-17248 | * | 2/1983 |
| JP | 63-225753 | * | 9/1988 |

* cited by examiner

*Primary Examiner*—Thomas R. Hannon
*Assistant Examiner*—Marcus Charles
(74) *Attorney, Agent, or Firm*—Rothwell, Figg, Ernst & Manbeck

(57) ABSTRACT

In a constant-horsepower transmission having a primary pulley, a secondary pulley and a belt extended between the primary and the secondary pulley, a predetermined frictional force acting between the pulley and the belt is secured by an external instruction, and the pulley is capable of automatic alignment and shock absorption to ensure stable power transmission from the belt to the pulley. A first compressing device compresses an elastic device in response to an external instruction, a first pressing device including the elastic device applies a pressure and an elastic force produced by the compressed elastic device to the belt through the pulley. A predetermined frictional force is secured by the pressure and stable power transmission is insured by the elastic force. A first pressure application controller executes a variable pressure application control operation to apply an optional pressure to the belt by displacing or not moving the movable disk of the pulley.

33 Claims, 9 Drawing Sheets

BELT PRESSING MECHANISM FOR CONTINUOUSLY VARIABLE TRANSMISSION

BACKGROUND OF THE INVENTION

1. Field of the Invention

The present invention relates to a belt pressing mechanism employing an improved elastic device for a constant-horsepower transmission capable of frictionally transmitting power and used in industrial machines, such as machine tools, vehicles, motors, generators and the like. More particularly, the present invention relates to a belt pressing mechanism suitable for high-load power transmission, capable of stabilizing the transmission of high pressure produced by a compressed elastic device through a pulley to a belt, and of extending the life of the belt by suppressing the high-pressure deterioration of transmission members including elastic members and a belt.

2. Description of the Related Art

Various devices having a secondary pulley combined with an elastic member, and a primary pulley not combined with any elastic member are disclosed in Japanese Patent No. 1,624,499 and U.S. Pat. Nos. 5,334,103 and 5,567,094 and have been put on the market. The power output characteristic of the secondary pulley of such a device is capable of constant-torque power transmission and is incapable of constant-horsepower power transmission for the following reasons.

Power P (W) that is transmitted to a load is expressed by:

$$P = 1.027 \times N \times T \quad (1)$$

where N (rpm) is rotating speed and T (kg·m) is torque.

When transmitting a required power $P_0$, the torque T must be decreased when the rotating speed N is increased, and the torque T must be increased when the rotating speed N is decreased. The elastic member pressure controller based on the conventional technical idea increases the compressive pressure as the rotating speed increases and decreases the compressive pressure as the rotating speed decreases; that is, the pressure is directly proportional to the rotating speed. In a constant-horsepower transmission, the pressure must be inversely proportional to the rotating speed. Therefore, a belt transmission member pressing device employing an elastic member of this type is unable to produce a required frictional force and constant-horsepower transmission cannot be practiced in principle.

When practicing an idea expressed by Expression (1), high pressure causes problems in a range of low rotating speeds. A first problem is a fact that a transmission member deforms and deteriorates in a short period under high pressure and a second problem is a fact that the transmission member is incapable of absorbing shocks of high pressure and power transmission becomes unstable or impossible. Shocks are given to a frictional transmission surface of the transmission member and portions of the frictional transmission surface in point contact with the transmission member are damaged mechanically. A transmission belt is permanently elongated and the elastic member sets permanently and the length thereof is reduced permanently when kept under a high pressure for a long time. Since a predetermined frictional force cannot be applied to the transmission pulley by a simple pressure applying operation, the degree of mechanical damage in the members due to the application of an excessively high pressure or an excessively low pressure thereto increases and the power transmission becomes impossible. Therefore three measures must be taken for the transmission member to which high pressure is applied. The transmission mechanism must be capable of a shock absorbing function and an aligning function to avoid damaging, deforming and deteriorating component members. The transmission mechanism must be capable of avoiding causing and making serious the deterioration and deformation of the component members. The transmission mechanism must be capable of compensating for the deformation and deterioration of the component members. Those conditions relate to the operating principle of the transmission mechanism and the structural features of the transmission mechanism. When those conditions are satisfied, transmission control operation can be stabilized and the life of the transmission mechanism can be extended.

SUMMARY OF THE INVENTION

Accordingly, it is a general object of the present invention to provide a belt pressing mechanism for a continuously variable transmission, capable of assuring a self-adjusting or automatic aligning function of one of two pulleys for constant-horsepower transmission to determine a stable position for a belt extended between the two pulleys by applying an elastic pressure corresponding to a normal pressure to the friction surface of the pulley and by making the simultaneous pressure application by the two pulleys or the independent pressure application by the elastic force applying pulley controllable to compensate for the deterioration of high-pressure members and to ensure long-term stable power transmission.

It is a first object of the present invention to extend the life of members subject to deterioration by providing a belt pressing mechanism capable of changing pressure in a low-pressure state in which deformation and deterioration are suppressed substantially as well as in a high-pressure state to maintain the stable frictional force of a high-pressure deteriorating member, such as an elastic member or a belt.

It is a second object of the present invention to provide a changing mechanism for selectively operating two pulleys in a variable speed operating mode in which the two pulleys are operated synchronously by a speed change instruction or in an individual pressure application mode in which pressure is applied only to an elastic force applying pulley by a pressure removal instruction to provide bases for various control modes.

It is a third object of the present invention to make possible synchronous change between the variable speed operating mode and the individual pressure application mode, to select a high-pressure state for a period in which the transmission is in operation or a low-pressure state for a period in which the transmission is not in operation, and to make the individual pressure application mode operate as a shaft torque control mode or a release pressure change mode.

It is a fourth object of the present invention to practice an automatic restoring and compensating function to restore an initial normal output rotating speed and output torque by compensating for deformation and deterioration of members caused by the application of high pressures for a long period of time or the repetitive application of high and low pressures by other means.

It is a fifth object of the present invention to practice not only a constant-horsepower transmission but also a constant torque, a single axial torque or a high pressure releasing operation by a pair of pressing functions comprising input and output pulleys operating independently as a reference pulley and a follower pulley irrespective of kinds of belts.

With the foregoing objects in view, a common means according to the present invention for solving the foregoing problems includes a driving means capable of selecting a variable speed operating condition or a non-variable speed operating condition and of applying pressure only to an elastic force applying pulley, and a pressure application controller capable of controlling individually the pressure force or the elastic force applying pulley in a variable-pressure control motion to ensure long-term stable transmission by giving a speed change instruction or a pressure removal instruction in the speed change operation or the non-variable speed operation.

According to a first aspect of the present invention, a means for solving the foregoing problems includes a driving means and a pressure application controller that set the elastic force applying pulley in a high-pressure state for frictional power transmission while the transmission is in a power transmitting operation or in a low-pressure state for suppressing the deformation and deterioration of an elastic member or a belt while the transmission is stopped.

According to a second aspect of the present invention, a means for solving the foregoing problems includes a first pressing device capable of controlling pressure applied to one of two pulleys, a second pressing device capable of controlling pressure applied to the other pulley, and a mode change controller for controlling the first and the second pressing device for synchronous or asynchronous operation according to instructions provided by pressure application controllers to select either a variable speed operating mode or an individual pressure application mode.

According to a third aspect of the present invention, a means for solving the foregoing problems includes a mode change controller for controlling operations for changing the two pulleys synchronously or asynchronously by the first and the second pressing device, and a pressure application controller for applying pressure to elastic members and/or a movable disc included in the pressing device for the elastic force applying pulley in an individual pressure application mode in a high-pressure state or a low-pressure state.

According to a fourth aspect of the present invention, a means for solving the foregoing problems estimates a deterioration error in a high-pressure deteriorated member from a measured rotating speed or a measured frictional force exerted by an output belt measured by a sensor, and a set rotating speed or a set frictional force stored in a processor, and adds a compensation value corresponding to the deterioration error to a speed change instructions or a pressure removal instruction given to the pressing devices to maintain a normal rotating speed and a normal frictional force.

According to a fifth aspect of the present invention, a controller provides an synchronous instruction for a first pressing device for applying an elastic pressure and a second pressing device for applying a non-elastic pressure thereto at the time of synchronous operation as a control instruction, and provides an asynchronous instruction at the time of asynchronous operation or an instruction to variably control only one of the pressing devices as a control instruction

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
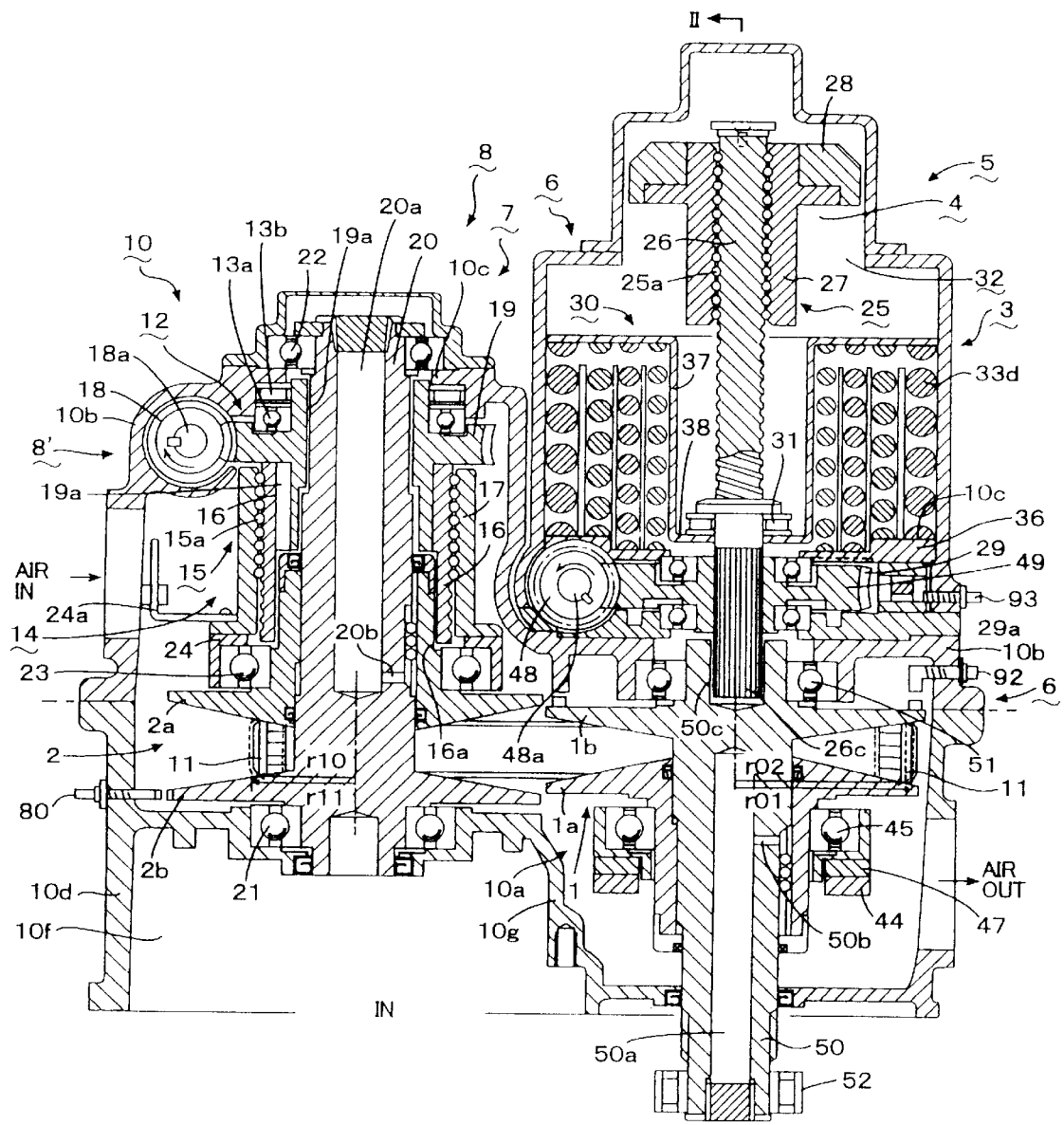
FIG. 1 is a cross-sectional view of a dry variable-speed transmission employing a belt pressing mechanism in a first embodiment according to the present invention.

The present invention proposes a novel idea relating to a pressure control system for controlling an elastic device for applying pressure to a transmission pulley and a transmission belt included in a transmission. The idea of the present invention is applicable not only to a large-capacity constant-horsepower dry transmission for a vehicle embodying the present invention but also to small-capacity transmissions for general industrial machines and very large-capacity wet transmissions. The embodiment is shown by an example in which pressures having non-elasticity and elasticity are applied to an input pulley and an output pulley respectively; however even if an elasticity pressure is applied to the input pulley and a non-elasticity pressure is applied to the output pulley, it is apparent that the same constant-horsepower transmission is achieved, since the non-elasticity pressure has a rotating number control function to position a transmission belt in the transmission pulley while the elasticity pressure has a transmitting frictional force control function or a torque control function to continuously apply the pressure to a belt frictional surface even if the supply of the elasticity pressure is stopped. Therefore, the appropriate number of rotation and torque are secured by combining the elasticity pressure with the non-elasticity pressure. Accordingly, examples in which pressures applied to each pulley may be changed to reverse input and output of the present embodiment are also included in the present invention. Further, since the present invention has an object to specialize modes of applying a pressure to each pulley, and protect members deteriorated by high pressure such as the elastic member or the belt transmission member, a well-known constant speed ration pulley may be used for a pulley at the side to which an elastic force is not applied.

The individual application of pressure to the pulley by the elastic device is possible both while the transmission is operating for power transmission and while the transmission is stopped. In a constant-horsepower transmission, elastic pressure can be reduced in a high rotating speed range. Therefore, when the permanent setting and deformation of the elastic members of the elastic device or the transmission member can be suppressed while the transmission is operating at rotating speed in a high rotating speed range using a low pressure, a speed change instruction substantially is a pressure removal instruction. An operating mode in which the transmission is set in a state for operation at a high rotating speed immediately before stopping the transmission and an operating mode in which the pressure applied to an elastic force supplying pulley is removed after stopping the transmission are included in the present invention. When a belt position is returned from an arbitrary speed ratio to an initial speed ratio position, a rotational speed instruction need to be solely applied to the primary pulley during transmission irrespective of a pressure instruction to the secondary pulley. Therefore, mode changing means may be disposed on respective instruction transmitting paths to solely press the primary pulley.

A conception of synchronously changing operating mode between the variable speed operating mode and the individual pressure application mode and a conception of pressure changing operating mode of the pulley in the individual pressure application mode belt the pressure removing and applying mode are separate conceptions. The pressure application change and/or the synchronous change can be selected according to the type of the transmission. Pressure application change in the release pressure change mode is carried out by a first pressure application controller that controls a first compressing device. Basically, an operation for the synchronous change of the principal pulley and the secondary pulley is carried out by a change controller. Therefore, the change controller may be included in a second pressure application controller. It should be noted that the synchronous operation is a motion in which the number of rotation No is inversely proportional to or proportional to the output torque To and a constant-horsepower transmission and a constant torque transmission are synchronously associated with each other, while the asynchronous operation is a motion in which the number of rotation No and the torque To are not synchronously associated with each other. Therefore, the single variable control for only the follower pulley allows the control of the output shaft torque according to a variable speed input power. If the No and To are simultaneously decreased and then are stopped when the transmission stop instruction is supplied, the elastic member is free from deterioration caused by a high pressure during the stoppage and a low speed start-up is achieved at the time of next start for transmission.

The elastic device may be a single elastic member and may be a coil spring, a dish spring, a spiral spring or the like. The elastic device may have a plurality of elastic members that are driven simultaneously and have a continuous linear pressure application characteristic or may have a plurality of elastic members that are strained individually and have a stepped pressure application characteristic. The elastic device may have a continuously curved pressure application characteristic. The elastic device may be disposed at either a rotating position or a nonrotating position provided that the same is able to apply compressive pressure to the secondary pulley.

Although the compressing device in the preferred embodiment is a ball screw, the compressing device may be a device including a screw having a trapezoidal thread, a moving mechanism including a rotating cam, sliding mechanism operated by the pressure of a fluid, such as a hydraulic cylinder actuator, a jack mechanism or the like. The driving device may be of a separately excited type or a manually operated type.

The displacement $L_0$ on one side of the input and output pulleys must be about twice the displacement $L_1$ on the other side of the pulleys or greater. Since operating direction and amount of operation are dependent on circumstances, elements including pitch of the screw of each compressing device, rotating direction, rotating speed, the type of the screw thread (right-hand or left-hand) of the screw thread and the gear ratio of the gear train may be selectively determined according to design. The driving device is an ac or dc servomotor provided with a false signal intercepting means having a self-locking function of a reversible motor, i.e., a reversing preventing braking function and a overrun inhibiting function to prevent interference between false signals in the driving device and the pressing devices. A stepping motor may be driven in an open-loop control mode when the stepping motor has the functions of a checking means. It is obvious for those who skills in the art that when the number of rotation and the pressure force are compensated by detection values detected from a detector, the detection values are learned and processed by an arithmetic processing unit and thereby each motor can be servo-controlled using the open loop or the closed-loop.

An elastic pressure provided by the pressing device may be applied between a transmission pulley and a body. The sequence of arrangement and positions of the elastic device and the compressing device between the transmission pulley and the body may be optionally determined according to design. When those are set in a nonrotating state, the a rotation separating bearing may be disposed between the adjacent ones of the transmitting pulley, the compressing device, the elastic device and the body. The elastic device and the compressing device need not necessarily be coaxial with the axis of the transmitting pulley, those components may be disposed individually in combination at optional positions and connected to the transmitting pulley by a pressure transmission device. Therefore, an elastic force must be transmitted from the elastic device to the pulley to absorb shocks, and the first compressing device and the pressure transmitting device or bearings must be supported in a floating state. The elastic device and the compressing device include similar members, sliding members, pressure transmitting device and the like are interposed between the elastic device and the compressing device, other members may be used in common with other devices, the members including the disk and the body of the transmitting pulley may be used, and any suitable members may be used and changes may be made without departing from the scope of the present invention.

First Embodiment

FIGS. 1 to 7 are views of assistance in explaining a belt pressing mechanism in a first embodiment according to the present invention provided with an elastic device and incorporated into a dry transmission having a primary pulley, a secondary pulley and a belt extended between the primary pulley and the secondary pulley, wherein the construction of a dry continuously variable transmission for a vehicle and the characteristic of a pressing device are shown. A transmission 10 includes, as basic components, a variable-speed transmission 10a having an input primary pulley (driving pulley) 2, an output secondary pulley (driven pulley) 1 and a belt (transmission member) 11 extended between the variable-pitch pulleys 1 and 2, a secondary pulley operating device 6 for operating the secondary pulley 1, a primary pulley operating device 8 for operating the primary pulley 2, and a belt pressing mechanism 7 including a driving device 9 for driving the operating devices 6 and 8 synchronously or asynchronously. The variable-speed transmission 10a is separated from other transmission mechanisms by a partition wall 10g. A chamber containing the variable-speed transmission 10a is ventilated for cooling through openings. The belt pressing mechanism 7 further has a first pressure application controller 60A and a second pressure application controller 60B including an instruction controller 90 for controlling the operating devices 6 and 8.

The primary pulley operating device 8 has a second pressing device 8' applying a pressure to a second compressing device 14 having a pressure application device 12 and a sliding device 15. The secondary pulley operating device 6 has a first pressing device 5 having an elastic device 3 and a first compressing device 4 for compressing the elastic device 3. The first and second pressing device 5 and 8' are driven by the driving device 9. The first compressing device 4 has a sliding device 25, and a pressure application device 29 that drives both the secondary pulley 1 and the elastic device 3 simultaneously. The operating devices 6 and 8 having the pressing devices 5 and 8' for controlling pressures applied to the secondary pulley 1 and the primary pulley 2, the belt 11 and the driving device 9 of the belt pressing mechanism of the present invention having the elastic device 3 will be described hereinafter.

Figure 2:
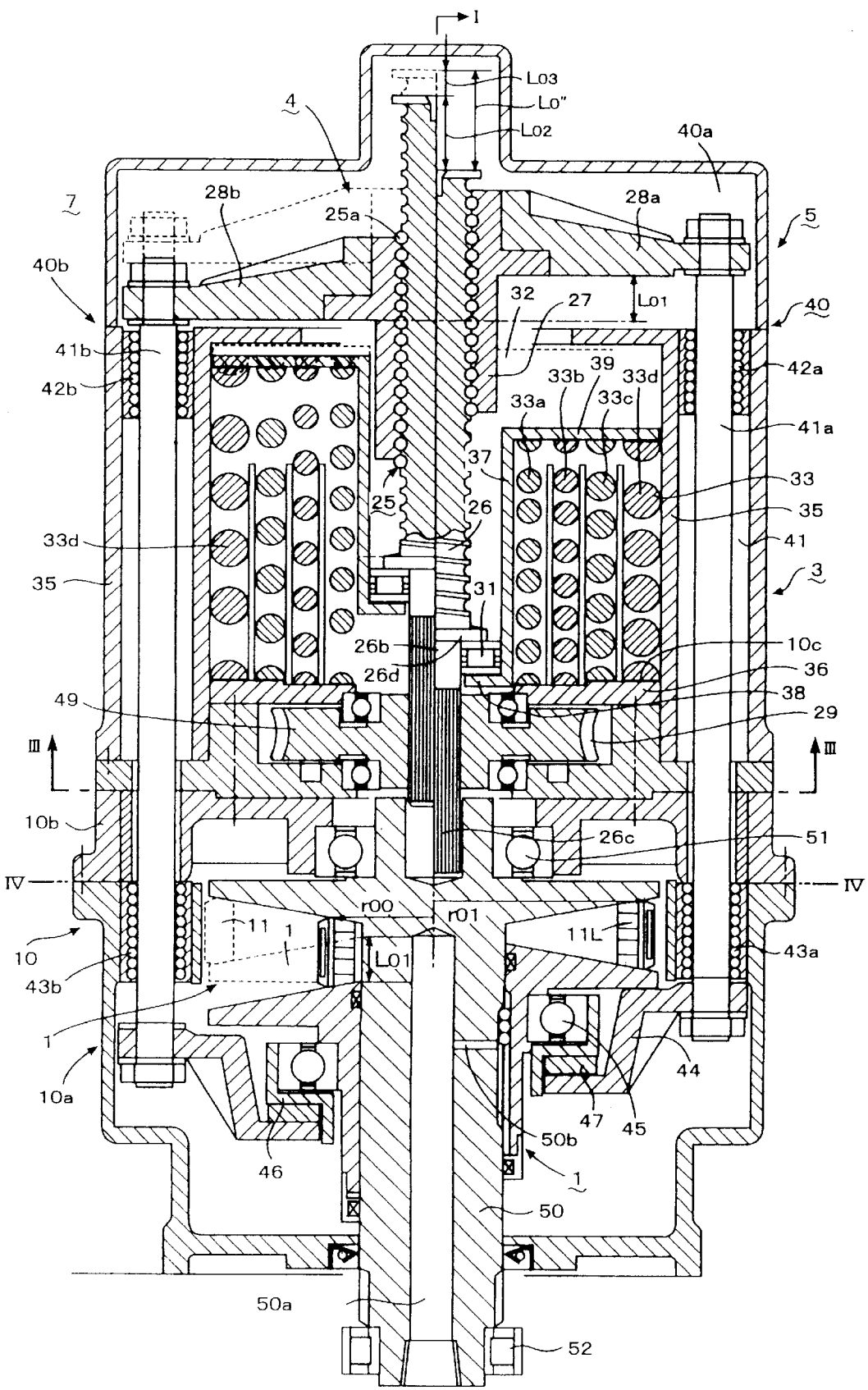
FIG. 2 is a longitudinal sectional view taken on line II—II in FIG. 1.

The secondary pulley 1 has a fixed disk 1b and a movable disk 1a disposed coaxially with the fixed disk 1b, restrained from turning relative to the fixed disk 1b by a key and axially slidable relative to the fixed disk 1b. The primary pulley 2 has a fixed disk 2b and a movable disk 2a disposed coaxially with the fixed disk 2b, restrained from turning relative to the fixed disk 12 by a key and axially slidable relative to the fixed disk 2b. The respective pressures exerted on the pulleys 1 and 2 by the operating devices 6 and 8, respectively, are controlled to vary the respective working radii of the pulleys 1 and 2 continuously to transmit a predetermined horsepower in the entire range of speed change ratio. In FIG. 1, the belt 11 is at a position for a maximum speed change ratio in a variable-speed operating mode. A right half of FIG. 2 show the positions of component parts when the secondary pulley 1 is set in a maximum working radius and a left half of FIG. 2 shows the positions of the component parts when the secondary pulley 1 is set in a minimum working radius. In the left half of FIG. 2, broken lines indicate the positions of the component parts when the first compressing device 4 reduced the compression $P_0$ of the elastic device 3 in an individual pressure application mode using only the first pressing device 5 in a stationary state after the transmission has been stopped.

The second pressing device 8' of the primary pulley operating device 8 is composed of the second compressing device 14 having the pressure application device 12 and the sliding device 15. The sliding device 15 has two sliding members 16 and 17, and a pushing device 15a of a ball-screw mechanism. The pressure application device 12 has a worm 18 and a worm wheel 19. The second pressing device 8' has the sliding device 15 consisting of rigid members to eliminate unstable positioning factors, such as elastic force, to reproduce a reference position accurately for variable-diameter control. As shown in FIG. 1, the sliding device 15 consists of the tubular worm wheel 19 and the tubular pushing device 15a. The pressing device 8' is provided with through holes 16a and 19a. The sliding shaft of the primary pulley 2 is inserted in the through holes 16a and 19a. The sliding device 15 is disposed at a position substantially corresponding to that of the pressing device 5 of the secondary pulley operating device 6 in parallel to the latter. The opposite ends of a main shaft 20 having an oil chamber 20a are supported in bearings 21 and 22. Pressure is applied to the second pressing device 8' through bearings 13a and 13b and 23 disposed between a reference surface of a body 10c and the primary pulley 2. When the sliding member 16 is turned by the worm wheel 19, the sliding member 17 is guided by a guide bar 24a for axial sliding. A second compressing device 14 has a screw member provided with a right-hand thread. A thrust casing 24 serves as a pressure transmitting device. The pressing device 8' shown in FIG. 1 does not have any elastic members and is capable of direct pressure application to vary the working radius r1 of the primary pulley 2.

Although the first pressing device 5 of the secondary pulley operating device 6 makes the movable disk 1a slide, the first pressing device 5 is not disposed near the movable disk 1a and is placed on a cover 10b in a plane including the primary pulley operating device 8 and is restrained from turning. The first pressing device 5 includes two parallel transmission levers 41a and 41b disposed on the opposite sides of a sliding member 27, respectively, linear ball bearings 42 and 43, a shifter 44, and a pressure transmitting device 40 that transmits pressure through gimbals 47 mounted on the secondary pulley 1, a thrust bearing 46 and a bearing 45. The first pressing device 5 includes the elastic device 3, the first compressing device 4 similar in construction to the second compressing device 14. The elastic device 3 and the first compressing device 4 are pressed against the opposite ends of a bearing 31, respectively. The pressure of the elastic device 3 for compressing the secondary pulley 1 is applied through the bearing 31, the first compressing device 4 and the pressure transmitting device 40 to the secondary pulley 1 with reference to the reference surface 10c of a bottom cover 36. The first pressing device 5 is detachably contained in the cover 10b coaxially with the secondary pulley 1.

The elastic device 3 is a detachable single structure 30 having a plurality of cylindrical elastic members 33 coaxially placed in a case 35 and preloaded. The elastic device 30 is able to exert a high pressure that cannot be exerted by a single elastic member in a narrow space and to inhibit the growth of deformation and deterioration. Each of four elastic members 33a, 33b, 33c and 33d, which will be inclusively indicated at 33, has one end resting on the body 10c and the other end resting on a sliding member 37 having a flat connecting part 39. The plurality of elastic members 33 are contained in the case 35 and are compressed by the bottom cover 36 serving as a pressure plate so as to exert a predetermined pressure. The initial pressure is approximately equal to a pressure $P_0$ in a release mode in which the pressure compressing the secondary pulley 1 is removed so that the elastic members 33, such as coil springs, are set up such a predetermined pressure to avoid damaging, deforming and deteriorating even if the initial pressure is applied continuously for a long period of time to the elastic members 33. The upper end wall of the case 35 is provided with an opening 32. The sliding device 25 of the first compressing device 4 is inserted through the opening 32 into the case 35 to push the bearing 31 seated on the lower end wall 38 of the sliding member 37 to compress the elastic members 33. Since the elastic members 33 are subject to quick deformation when the same is used in a high-temperature atmosphere. Therefore, a space containing the elastic members 33 needs ventilation for cooling as well as the space containing the variable-speed transmission 10a.

The first compressing device 4 has the sliding device 25 including sliding members 26 and 27 provided with pushing devices 25a, and the pressure application device 29 including a worm 48 and a worm wheel 49, and the elastic device 3 is disposed between those members. The sliding member 26 has a screw portion 26a, a connecting portion 26b, a sliding portion 26c and a pushing portion 26d. The sliding portion 26c is a spline shaft. The worm wheel 49 is mounted on and mated with the sliding portion 26c to transmit rotation to the sliding member 26. The sliding member 26 is able to move axially relative to the worm wheel 49. The sliding device 25 of the first compressing device 4 is combined between the secondary pulley 1 supported on the body 10 and the elastic device 3. The sliding device 25 is supported in a floating state relative to the elastic device 3 to transmit elastic force to the secondary pulley 1. The sliding member 16 of the sliding device 15 is provided with a right-hand thread and the sliding member 26 of the sliding device 25 is provided with a left-hand thread. As shown in FIG. 2, the sliding member 27 is connected to a pressure transmitting device 40 by a connecting lever 28 having two arms 28a and 28b. The sliding members 26 and 27 are supported in a floating state on the end wall 38 of the sliding member 37 and a transmission lever 41 connected to the secondary pulley 1. Since the elastic members 33 vibrates, the sliding portion 26c has a predetermined length and is stored in a opening space 50c.

Figure 3:
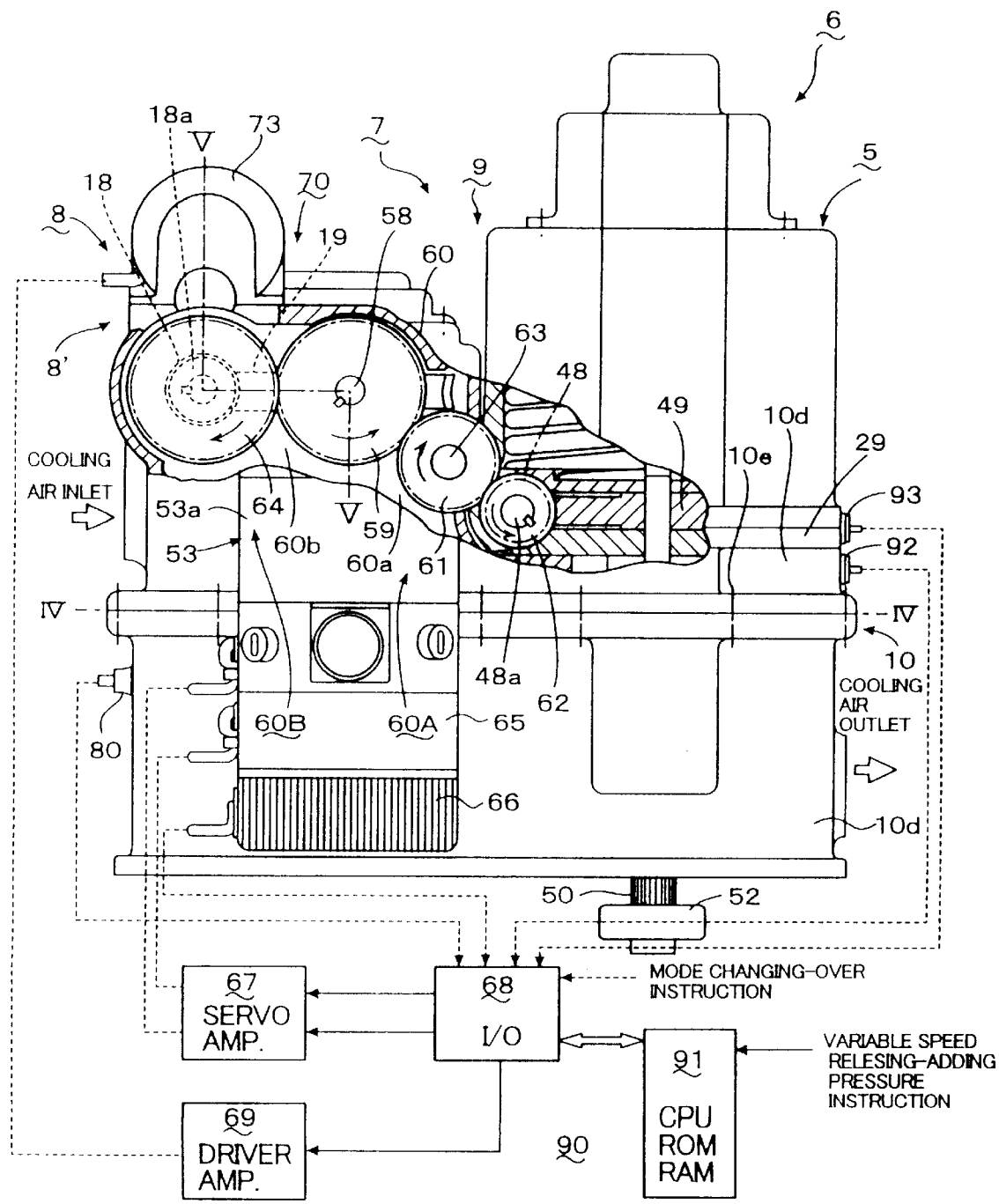
FIG. 3 is front elevation of first and second pressure application controllers for pressing devices included in the dry variable-speed transmission shown in FIG. 1.

Referring to FIGS. 3 and 4, the driving device 9 is a dc servomotor 53 provided with a brake 65. The driving device 9 drives the respective driving shafts 18a and 48a of the primary pulley operating device 8 and the secondary pulley operating device 6 synchronously or asynchronously through two transmission devices 55 and 60. Instruction power representing a speed change instruction or a pressure removal instruction and applied to a shaft 54 is transmitted through gears 56 and 57 to a shaft 58, and further through the shaft 58 and gears 59 and 64 of a second gear train 60b on an instruction transmitting path to the driving shaft 18a of the primary pulley operating device 8, and from the shaft 58 through an idler 61 and gears 59 and 62 of a first gear train 60a to the shaft 48a. The first gear train 60a on the instruction transmitting path, the instruction controller 90 and the reversible motor 53 form a first pressure application controller 60A for applying pressure to the first pressing device 5. The second gear train 60b, the instruction controller 90 and the reversible motor 53 form a second pressure application controller 60B for applying pressure to the second pressing device 8' and a switching controller 70. The instruction controller 90 gives several kinds of instructions to the pressing devices 5 and 8'. The respective different numbers of teeth of the gears 64, 63 and 62, are determined so that the displacement $L_0$ (=$L_{01}+L_{02}$) of the first pressing device 5 for pressing the secondary pulley 1 is greater than the displacement $L_1$ of the sliding device 15 for operating the primary pulley 2, and the movable disk 1a and the elastic members 33 are pushed and moved simultaneously. In this embodiment, the first pressing device 5 supplement the compressing displacement $L_{02}$ with a release displacement $L_{03}$ so as to be moved by a displacement $L'_0$ (=$L_{01}+L_{02}+L_{03}$) to remove only the pressure exerted by the elastic device 3 in an individual pressure application mode. The displacement $L_{03}$ is not dependent on the sliding movement of the secondary pulley 1.

The instruction controller 90 has a processor 91 including a servo amplifier 67, an I/O device 68, a switching amplifier 69, a processor CPU, a memory ROM and a memory RAM. The geared dc servomotor 53, the brake 65 and an encoder 66 are connected to terminals. The switching controller 70 is connected to the terminals of a solenoid actuator 73 and a rotating speed measuring device 80 for measuring the rotating speed of the primary pulley 2. These devices are known ones published in, for example, "General Catalogue 1998–1999 Servo Systems", Sanyo Denki K. K., and available on the market and hence description thereof will be omitted. In the driving device 9, the motor 53 is provided with the brake 65, and the first pressing device 5 and the second pressing device 8' are provided with the worm gears to prevent interference between error signal components due to speed change or pressure removal instruction.

Figure 4A:
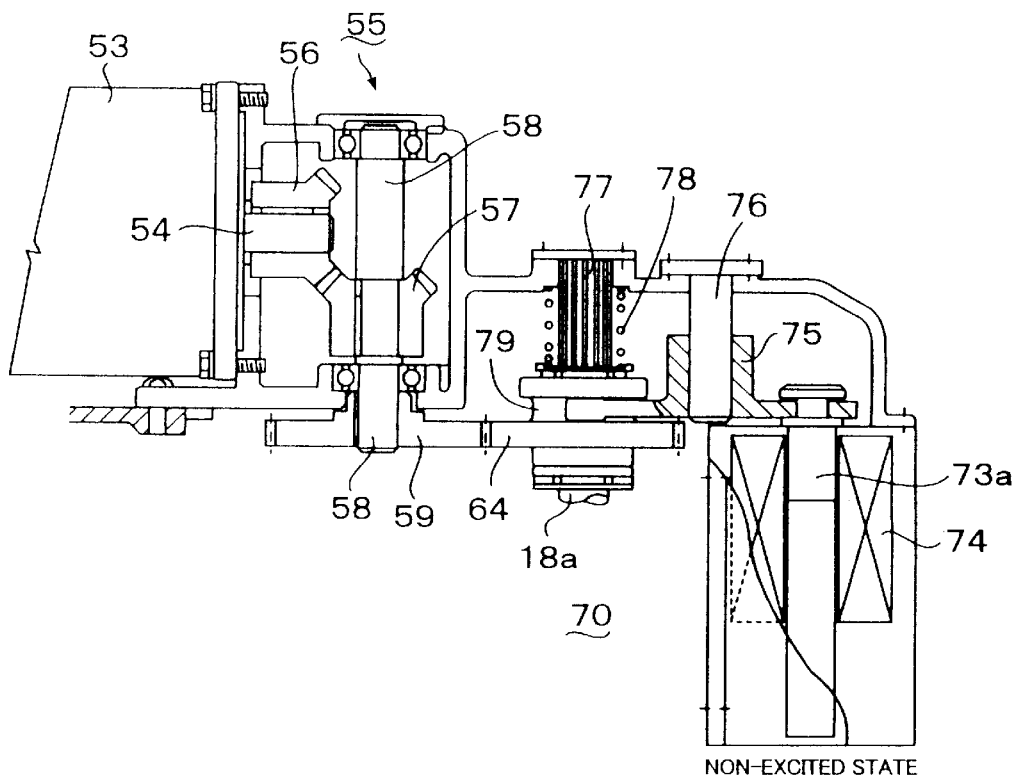
FIG. 4A is a front elevation of a change controller included in an instruction controller shown in FIG. 3 in a synchronous variable speed operating mode in which pressing devices operate synchronously.
Figure 4B:
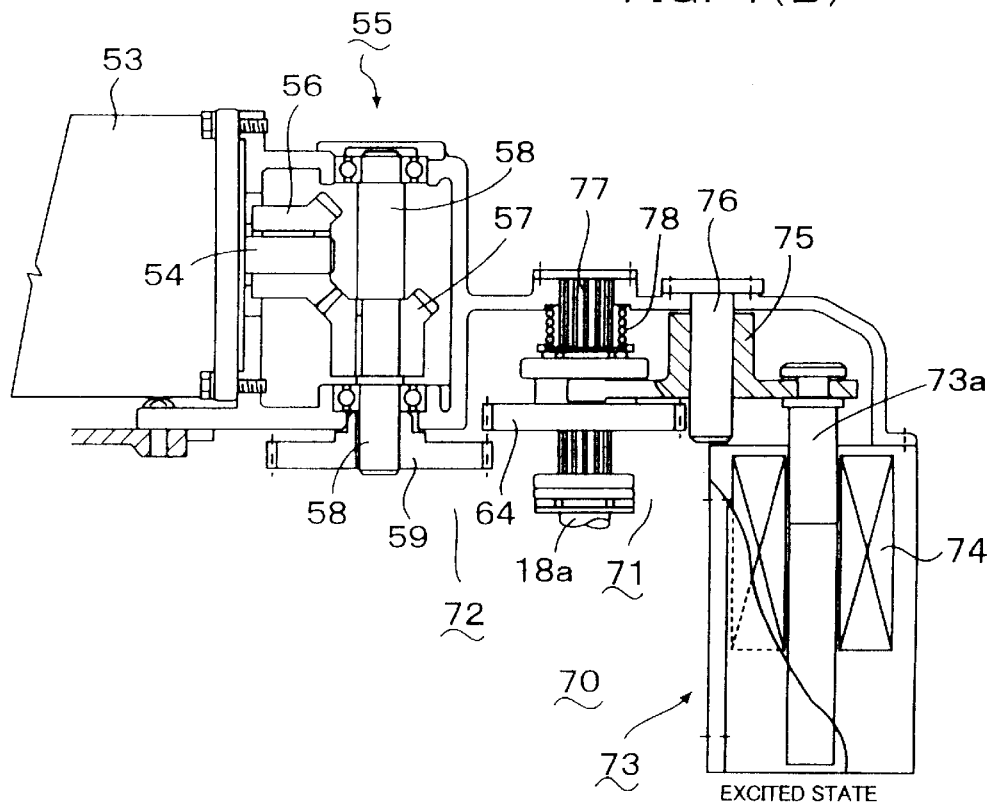
FIG. 4B is a front elevation of the change controller in an individual pressure application mode in an asynchronous state.

FIG. 4 shows the switching controller 70 that electromechanically changes the synchronous state or the asynchronous state of the first pressing device 5 and the second pressing device 8' when applying pressure to the first pressing device 5 and the second pressure application device 8 by the driving device 9, taken along line V—V of FIG. 3. FIG. 4A shows a state where the transmission is in a variable speed operating mode in a synchronous pressure application state and FIG. 4B shows a state where the transmission is in an individual pressure application mode for pressing and controlling only the secondary pulley 1 in an asynchronous pressure application state. In the state shown in FIG. 4A, since the gears 59 and 64 are engaged, a speed change instruction is sent synchronously from the driving device 9 to the pressing devices 5 and 8'. In the state shown in FIG. 4B, since the gears 59 and 64 are disengaged, the speed change instruction is transmitted only to the first pressing device 5 and is not transmitted to the second pressing device 8'. A pressure removal instruction for the variable pressure control of the secondary pulley 1 is asynchronous with input and is given individually. Although the pressure removal instruction has the same signal power quality, the same does not have speed changing function.

In this embodiment, the switching controller 70 is a known gear synchronizing device or a clutch changing means comprising three basic components, i.e., a gear shifting device 71 including the gear 64, a spline shaft 77, a spring 78 and a shifter connecting member 79, a gear synchronizing device 72 and a solenoid actuator 73 for biasing a shifter 75 on a shaft 76. The gear synchronizing device of this kind for smoothly engaging the gears 59 and 60 is used prevalently on machine tools and vehicles and the description thereof will be omitted. Such gear synchronizing devices are described in detail in, for example, Japanese Patent Nos. 1,253,548 and 1, 279,865. The plunger 73a of the solenoid actuator 73 is at a position shown in FIG. 4A when the solenoid 74 of the solenoid actuator 73 is not energized, and is at a position shown in FIG. 4B when the solenoid 74 is energized.

Figure 5A:
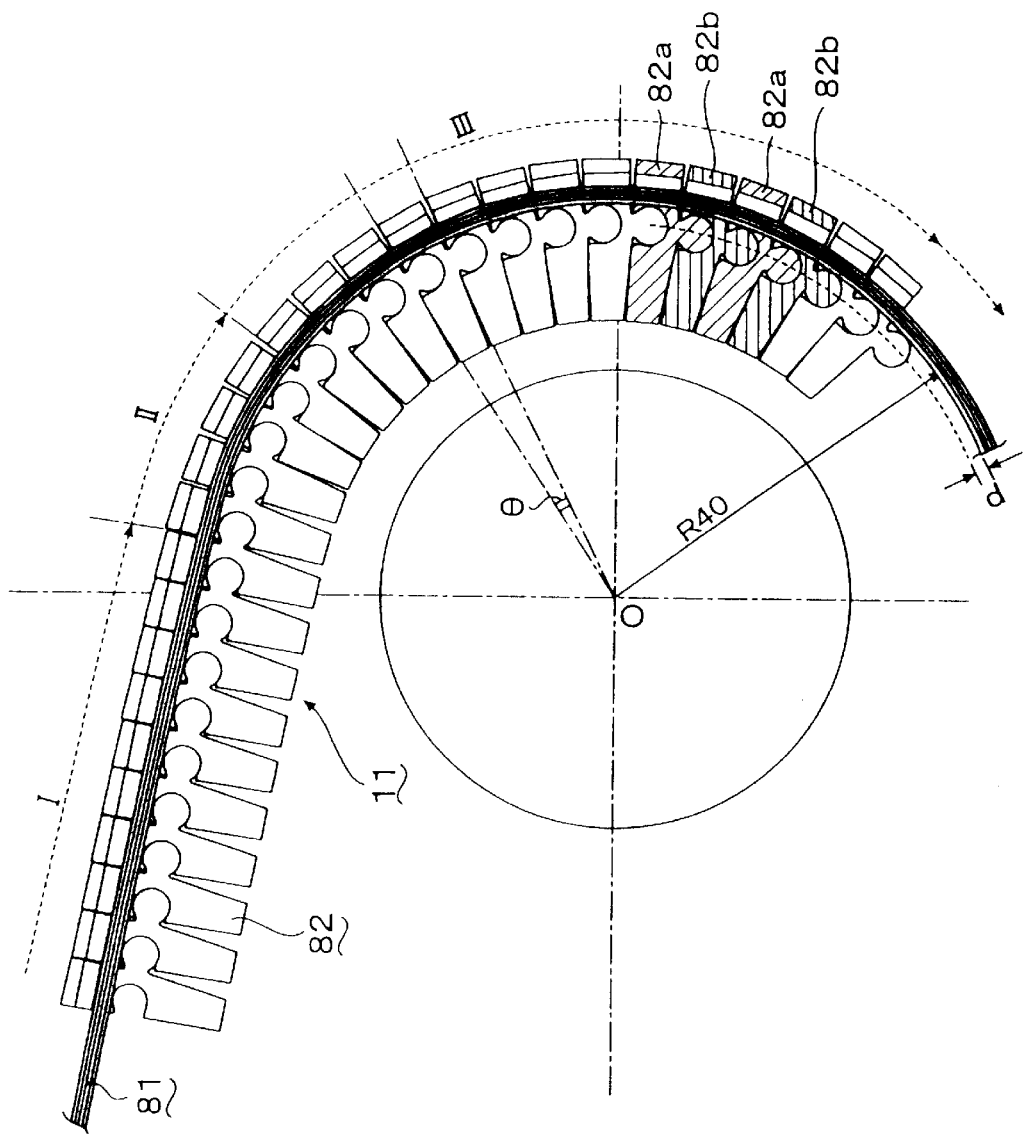
FIG. 5A is a fragmentary sectional view of a transmission belt employed in the variable-speed transmission shown in FIGS. 1 and 2.
Figure 5B:
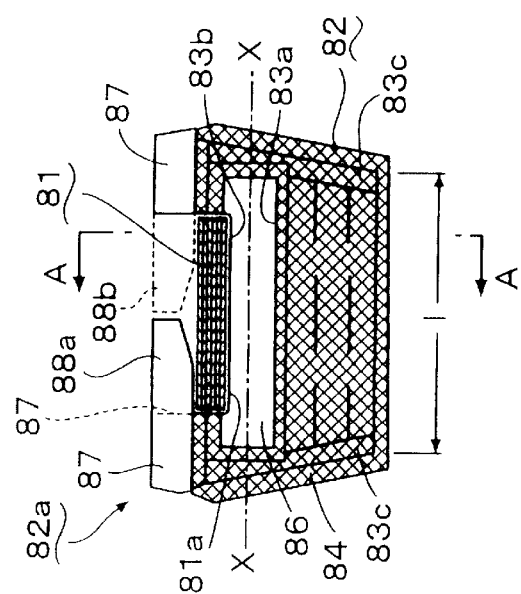
FIG. 5B is a front elevation of a pressure bearing member of the transmission belt shown in FIG. 5A.
Figure 5C:
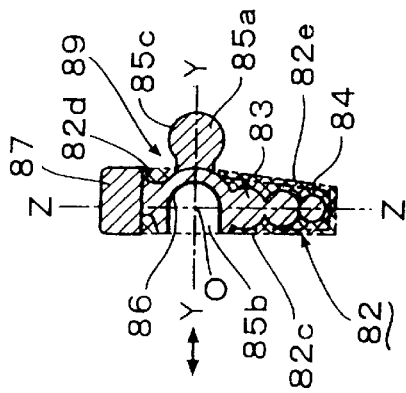
FIG. 5C is a side elevation of the pressure bearing member shown in FIG. 5B.

FIG. 5 shows the belt 11 of a dry push type formed by movably hanging a plurality of pressure bearing members 82 on an endless belt 81 formed by superposing thin metal strips. It is a primary feature of the belt 11 that each pressure bearing member 82 is formed by coating a hard base member 83 of a light alloy, such as a titanium or aluminum alloy, and by a soft coating member 84 of a thermosetting resin containing carbon whiskers. Each pressure bearing member 82 has connecting part 89 having a projection 85a projecting from one of the flat surfaces of the base member 83 and a recess 85b formed in the other flat surface of the base member 83. The belt 11 is disclosed in U.S. Pat. No. 4,900,296. It is a second feature of the belt 11 that the pressure bearing members 82 are linked longitudinally successively by fitting the projections 85a in the recesses 85b of the adjacent pressure bearing members 82 so that the connecting parts 89 are on the inner side of the endless belt 81 and a distance d from a center axis O is constant. A cut 83b is formed in an upper portion of the surface of the recess 85b of each pressure bearing member 82, and an upper portion 85c of the semicylindrical projection 85a of the adjacent pressure bearing member 82 fitted in the recess 85b is pressed against the belt 11 by a high pressure exerted thereon by the pulleys 1 and 2 to keep the belt 11 in a stretched state. The inner surfaces of the recesses 85b are coated with a hard film 86 of a ceramic material or a metal formed by thermal spraying.

The pressure bearing members 82 include first pressure bearing members 82a having a left support part 87 provided with a suspending projection 88a as indicated by solid lines in FIG. 5B, and second bearing members 82b having a right support part 87 provided with suspending projections 88b indicated by dotted lines in FIG. 5B. The first pressure bearing members 82a and the second pressure bearing members 82b are arranged alternately on the belt 81 as shown in FIG. 5A to prevent the pressure bearing members 82 from falling off the belt 81. Each pressure bearing member 82 has a parallel surface 82c on one side thereof, and a parallel surface 82d and a inclined surface 82e on the other side thereof. Therefore, in a straight section I of the belt 11 between the pulleys 1 and 2, the parallel surfaces 82c and 82d are in close contact with each other and the joints 89 are pressed against the adjacent ones as shown in FIG. 5A and, in curved sections II and III in which the pressure bearing members 82 are held between the disks of the pulleys 1 and 2, the joints 89 are pressed against the adjacent ones and the surfaces 82c of the pressure bearing members 82 are inclined at a predetermined angle to those of the adjacent pressure bearing members 82, so that the belt 11 is flexible.

In the belt 11 of this type, the base member 83 having the shape of a thin sheet, and the coating member 84 bend slightly when a compressive force and an elastic force acting along the width of the pressure bearing member 82 are exerted on the pressure bearing member 82 by the disks of the pulley 1 (the pulley 2), and the plurality of joints 89 exerts radial forces to the belt 81. The elasticity of the pressure bearing members 82 permits the pressure bearing members 82 to warp elastically when a large load is applied locally to some of the pressure bearing members 82 to exercise a function to avoid being broken mechanically in addition to the automatic aligning function of the elastic device 3. The elastic force of the elastic device 3 makes the belt 11 align automatically, determines the working radii of the pulleys 1 and 2 automatically, absorbs shocks and ensures stable power transmission. When the elastic pressure is maintained while the transmission 10 is stopped the endless belt 11 will be elongated greatly. If the endless belt 11 is elongated excessively, output rotating speed will include errors, gaps between the pressure bearing members 82 will increase, and widthwise pressure will act irregularly to the pressure bearing members 82 to peel the coating members 84 off the base members 83 and the base members 83 are liable to be warped. Measures must be taken to avoid such troubles.

The operation of the transmission 10 will be described with reference to FIG. 6 principally in terms of the functions of the first pressing device 5 and the second pressing device 8'. An operating mode will be described on an assumption that the belt 11 of the transmission 10 is extended between the primary pulley 2 and the secondary pulley 1 for a maximum speed change ratio as shown in FIG. 1 to transmit the rotation of an input shaft 20 to an output shaft 50, and the input shaft 20 rotates at a fixed rotating speed.

(I) Variable-speed operating mode: The instruction controller 90 receives a speed increase instruction requesting decreasing speed change ratio and starts driving the reversible motor 53. A variable speed operating mode shown in FIG. 4A will be described. Speed changing power is transmitted to shafts 18a and 48a as indicated by the arrows in FIG. 3 to rotate the shafts 18a and 48a in the opposite directions. The screws 15a and 25a as pushing devices are provided with threads of opposite hands, respectively. When the second compressing device 14 applies a pressure to the disk 2a, the working radius of the secondary pulley 1 starts increasing from $r_{10}$ to $r_{11}$. At the same time, the pressing device 5 exerting a maximum pressure $P_{max}$ decreases the pressure acting on the sliding device 25 of the first compressing device 4. Consequently, the sliding member 37 moves up so as to reduce the pressure of the elastic device 3, the sliding member 26 of the sliding device moves up and the sliding member 27 moves down by an unwind amount, so that the lever 28 (FIG. 2) and the pressure transmitting device 40 reduce the elastic force applied to the secondary pulley 1 and the pressing device 8' associated with the primary pulley 2 pulls. Consequently, the belt working radius of the secondary pulley 1 decreases from $r_{01}$ to $r_{02}$.

Such changes correspond to change of characteristic on a characteristic line A of FIG. 6 from a point $a_1$ to a point $a_2$ as the rotating speed of the output shaft 50 changes from a rotating speed $n_1$ at a maximum speed change ratio $\epsilon_{max}$ to a rotating speed $n_2$ and to the reduction of the pressure applied to the secondary pulley 1 from $P_1$ to $P_2$ in response to a speed increase instruction. Thus, the pressure applied to the secondary pulley 1 and the rotating speed of the secondary pulley 1 are inversely proportional to each other. For the pulley 2, the instruction serves as a synchronous instruction. When a further speed increase instruction is given to the reversible motor 53, the same operations are repeated. Thus, the first pressing device 5 moves the disk 1a of the secondary pulley 1 and the sliding member 37 of the elastic device 3 simultaneously, the compressing pressure decreases in proportion to the increase of the rotating speed, and the compressing pressure reaches a minimum pressure $P_{max}$ when the rotating speed reaches a maximum rotating speed. To reduce the output rotating speed, a speed reduction instruction is given, the reversible motor 53 is reversed to reverse the foregoing operations. Thus, as shown in FIG. 4A, the first pressing device 5 and the second pressing device 8' are driven synchronously according to the speed change instruction of the driving device 9 when the transmission is in the variable speed operating mode.

The compressive pressure produced by compressing the elastic device by the first compressing device and the elastic force corresponding to the compressive pressure are applied by the secondary pulley to the belt, and the elastic pressure can be optionally varied by an external instruction independent of the primary pulley. The application of the elastic force corresponding to the pressure absorbs automatically internal and external error factors that affect the operation of the transmission, such as shocks and aging changes, in any range of speed change ratio, restores normal transmission automatically, applies a tension corresponding to speed change ratio to the belt and makes an automatic aligning function to stabilize the working radii of the pulleys and frictional force operate properly.

Incidentally, when the belt 11 is elongated during power transmission at a speed change ratio $\epsilon_1$ (FIG. 6B), the working radius of the primary pulley 2 remains unchanged and the working radius of the secondary pulley 1 increases accordingly and, consequently, the rotating speed of the output shaft 50 decreases. However, the frictional force changes slightly, the maximum pressed state is maintained and the elongation is absorbed automatically. When the widthwise contraction of the belt is deteriorated, the working radius of the primary pulley 2 decreases and that of the secondary pulley 1 increases and the rotating speed of the output shaft 50 decreases, but the power is transmitted properly. If impulsive vibrations are exerted on the input shaft 20 or the output shaft 50, the working radius of the primary pulley 2 or the secondary pulley 1 varies. However, the secondary pulley 1 exercises an automatic aligning function by the elastic force corresponding to the pressure. The impulsive vibrations are transmitted to the secondary pulley 1 and are transmitted from the pressure transmitting device 40 to the first compressing device 4. Since the sliding member 26 is supported in a floating state relative to the worm wheel 49 and is able to vibrate, the impulsive shocks is absorbed by the elastic device 3 and stable power transmission can be restored automatically in an instant.

An elastic force is applied to the secondary pulley 1 and any elastic force is not applied to the primary pulley 2 to cause respective the different functions of the pulleys 1 and 2 separately. The secondary pulley 1 secures shaft torque by pressure, and automatic alignment and stable power transmission by elastic force, while the primary pulley 2 serves as a reference function pulley for a rotation control function by the stable positioning of the disks 2a and 2b. Therefore, in the donstant-horsepower transmission, an instruction given to the primary pulley 2 is used for controlling rotating speed N, an instruction given to the secondary pulley 1 is used for controlling shaft torque T, exerted as a follower function pulley and control operations and compensating measures are allocated accordingly.

Figure 6A:
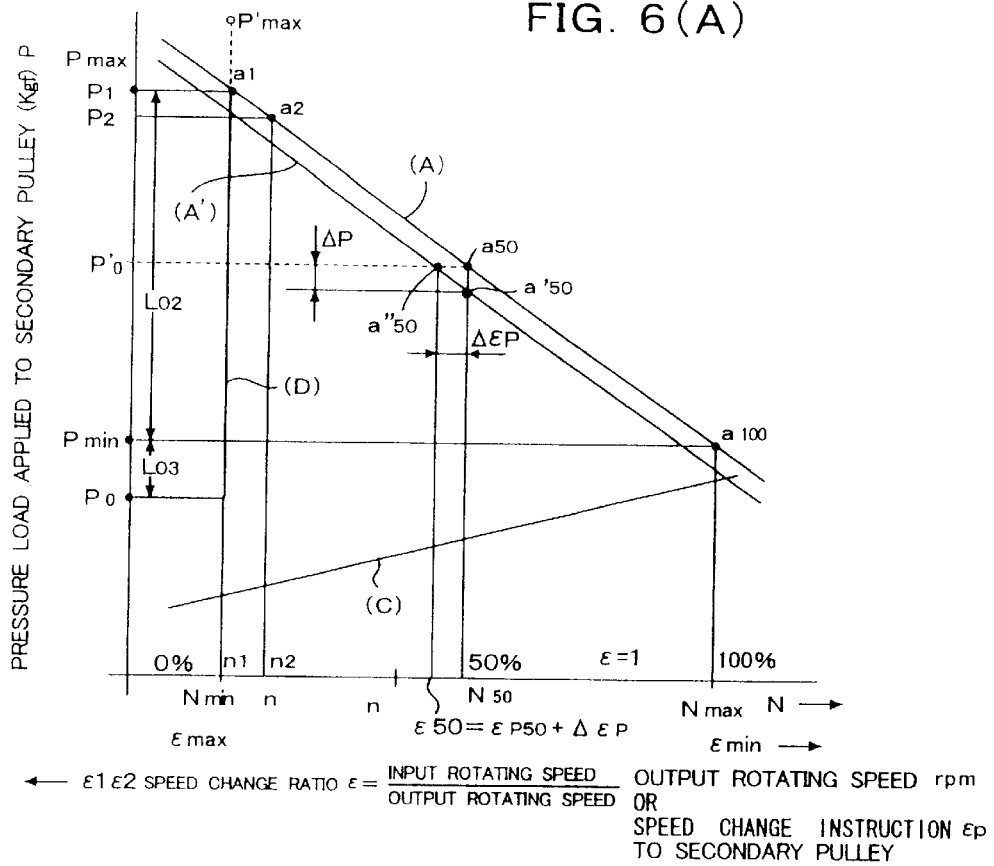
FIG. 6A is a graph showing the relation between speed change instruction or output rotating speed of a secondary pulley included in the belt pressing mechanism embodying the present invention.
Figure 6B:
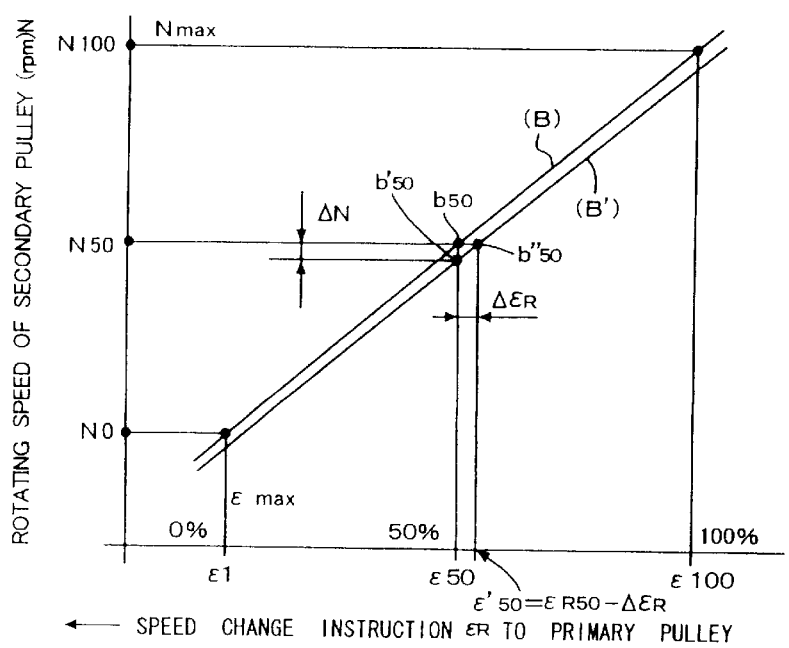
FIG. 6B is a graph showing the relation between speed change instruction to a primary pulley and output rotating speed of a secondary pulley.

FIGS. 6A and 6B show the mode of change of pressure and rotating speed versus speed change instruction and compensating measures when the elastic members of the elastic device are deteriorated and deformed and when the belt is deteriorated and deformed, respectively. In FIG. 6A, a characteristic curve A indicates a state before the elastic members 33 are deteriorated and are permanently set, and a characteristic curve A' indicates a state after the elastic members 33 are deteriorated and are permanently set. For example, a pressure difference $\Delta P$ is the difference between a pressure before deterioration corresponding to a speed change instruction $\epsilon_{50}$ and a pressure after deterioration corresponding to the same speed change instruction $\epsilon_{50}$. When a point moves on the characteristic curve A' from a point a'50 to a point a"50, an initial pressure $P'_0$ before deterioration can be restored. Since the characteristic is inversely proportional, a compensation value $\Delta \epsilon_p$ corresponding to the pressure difference $\Delta P$ is added beforehand only to the speed change or pressure removal instruction $\epsilon_{50}$ for the first pressing device 5 and the pressing devices 5 and 8' are controlled synchronously. A deviation due to deterioration is calculated on the basis of an initially set value stored in a storage device included in the processor 91, and a pressure measured by a pressure sensor 93, and a compensation value for the speed change instruction is calculated. Compensation of the variation of the output rotating speed due to the deterioration and deformation of the belt 11 shown in FIG. 6B is calculated by the same procedure, except that a compensation value $\Delta \epsilon_R$ corresponding to a rotating speed change $\Delta N$ is subtracted because the rotating speed of the secondary pulley 1 is proportional to the speed change instruction to the primary pulley 2, and only the speed change instruction $\epsilon_R$ given to the second pressing device is compensated by the compensation value because the primary pulley 2 controls rotating speed. The sign of the compensation value of the foregoing measures is dependent on whether the speed change instruction indicates a speed change ratio or a rotating speed. In this embodiment, it is assumed that the speed change instruction indicates a speed change ratio. A characteristic curve C in FIG. 6A indicates the characteristic of a conventional transmission.

Figure 7:
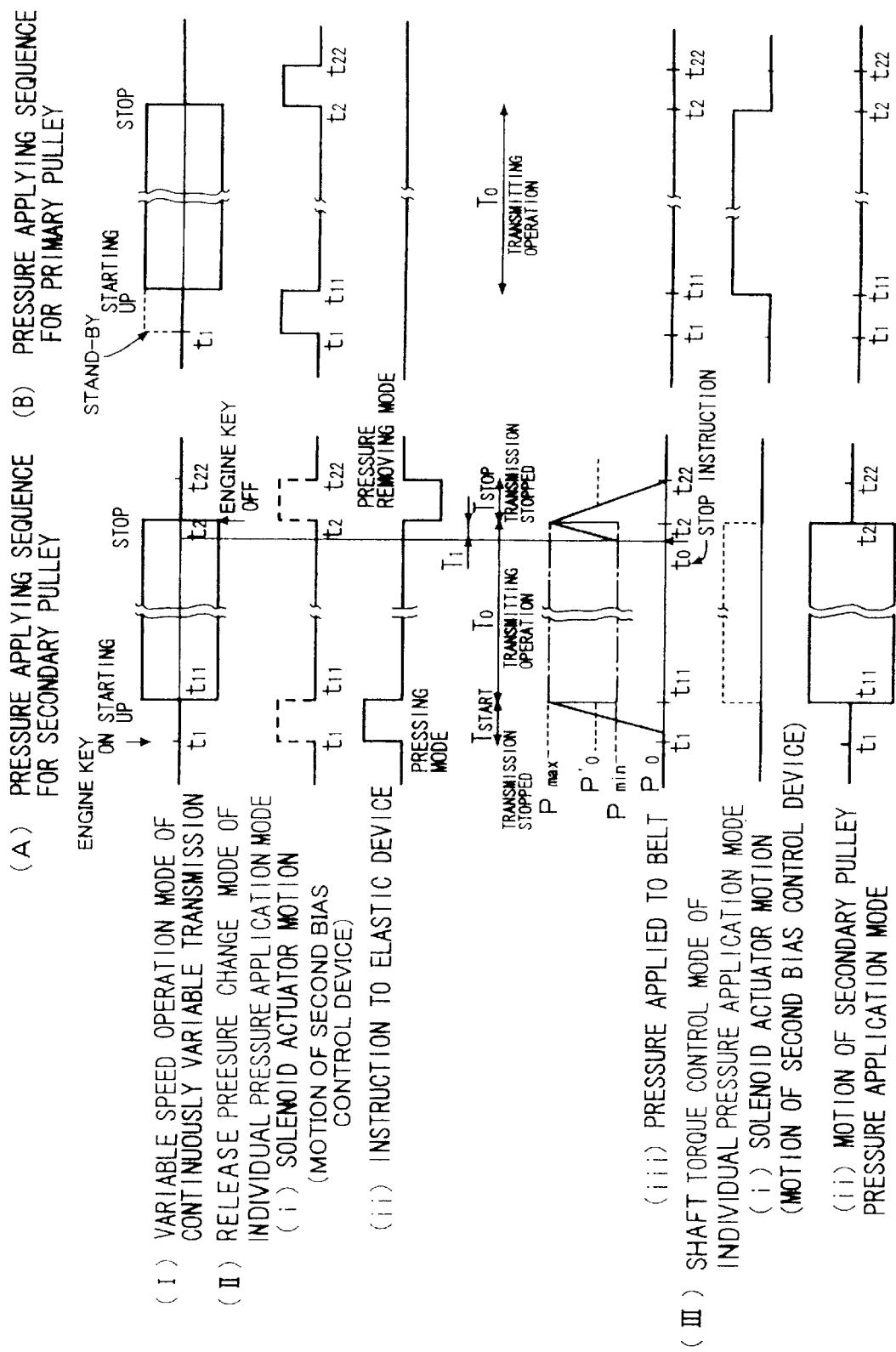
FIG. 7 is a timing diagram of assistance in explaining the respective operating modes of the primary pulley and the secondary pulley in the first embodiment.
Figure 8A:
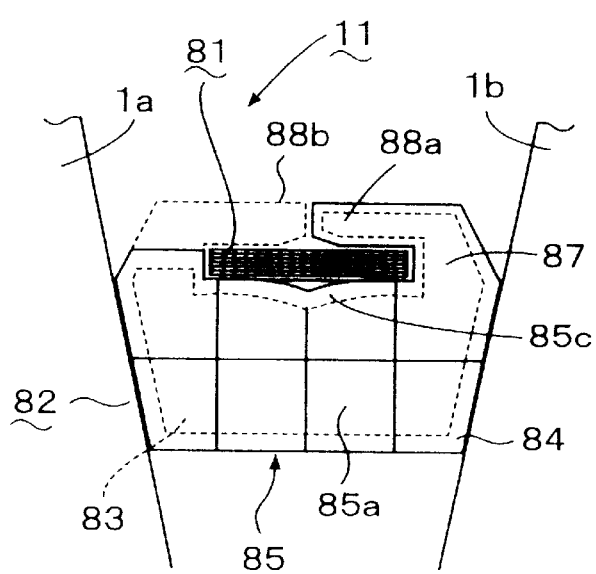
FIG. 8A is a front elevation of a transmission belt included in a second embodiment of the present invention.
Figure 8B:
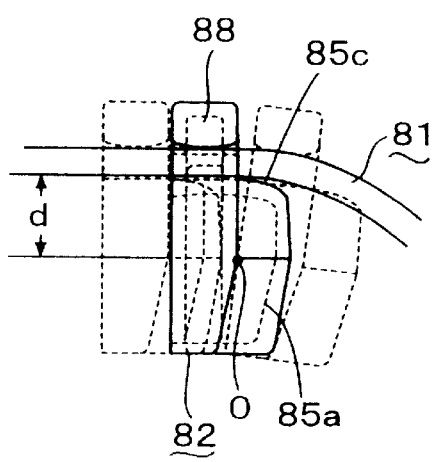
FIG. 8B is a side elevation of the transmission belt shown in FIG. 8A.
Figure 8C:
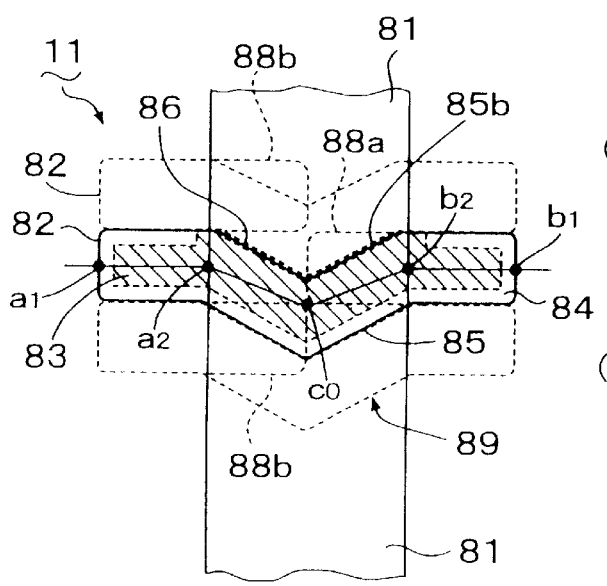
FIG. 8C is a top view of the transmission belt shown in FIG. 8A.
Figure 8D:
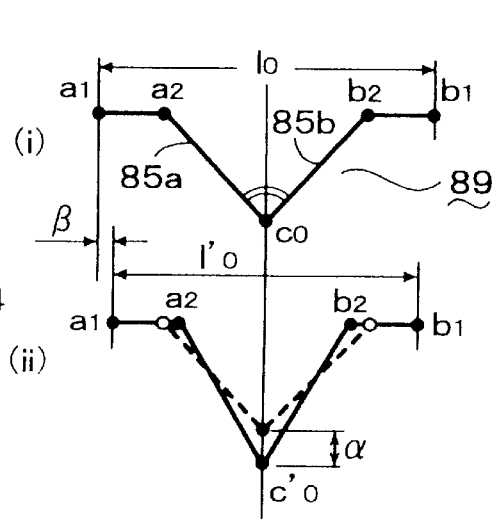
FIG. 8D is a diagrammatic view of assistance in explaining the principle of operation of the transmission belt shown in FIG. 8A.

The operation of the secondary pulley 1 in an individual pressure application mode shown in FIG. 4B will be described with reference to FIGS. 6 and 7. In the individual pressure application mode, pressure is applied only to the secondary pulley 1 by the first pressing device 5 and any pressure is not applied to the primary pulley 2 by the second pressing device 8'. Consequently, a variable-speed operation for changing the speed change ratio cannot be achieved. Therefore, a pressure application instruction and a pressure removal instruction are given only to the first pressing device 5 for applying pressure to the secondary pulley 1. The individual pressure application mode is carried out in one of two control modes, i.e., a release pressure change mode in which pressures applied to the elastic device 3 and the belt 11 are reduced while the transmission is not in operation to suppress the deterioration of the components, or a shaft torque control mode in which the pressure applied to the belt 11 by the elastic device 3 is varied positively while the transmission is in operation.

(II) Release pressure change or varying mode: A pressure applying mode is selected to apply high pressures to the elastic members 33 and the belt 11 by the first pressing device 5 when the transmission is operating, and a pressure removing mode is selected to remove the high pressures from the elastic members 33 and the belt 11 when the transmission is stopped. Generally, the transmission 10 receives a stop instruction at time $t_0$, a forced deceleration instruction is given in an off delay time $T_1$ to increase the working radius of the secondary pulley 1 to set the transmission 10 at a maximum speed change ratio $\epsilon_{max}$, and the primary pulley 2 is disconnected from a power unit, such as a primary mover at time $t_2$. The solenoid of the solenoid actuator 73 is energized at the time $t_2$ to disengage the gear 64 from the gear 59 by the gear shifting device 71 as shown in FIG. 4B. Consequently, an instruction provided by the driving device 9 cannot be used as a speed changing instruction and is used as an asynchronous instruction that serves as a pressure removal instruction for the first pressing device 5.

Although the transmission 10 is stopped, the driving device 9 gives a pressure removal instruction (speed increase instruction) to the first pressing device 5 for the pressure removing mode in a period $T_{STOP}$ between times $t_2$ and $t_{22}$. As indicated by broken lines in the left half of FIG. 2, the belt 11 is at a position corresponding to a working radius $r_{01}$ of the secondary pulley 1 for the maximum speed change ratio $\epsilon_{max}$, and the pressure application device 29 of the first compressing device 4 and the sliding device 25 are urged to move by a displacement $L''_0$ ($=L_{02}+L_{03}$) in a direction to reduce the compression of the elastic device 3. The working radius of the secondary pulley 1 does not change at all, the sliding device 25 moves the sliding member 37 of the elastic device 3 to reduce the compression of the plurality of elastic members 33, and the pressure of the elastic device 3 is reduced to a release pressure $P_0$ by a characteristic D shown in FIG. 6A with the speed change ratio kept at $\epsilon_{max}$. Thus, the pressures acting on the elastic members 33 and the belt 11 are reduced greatly while the transmission 10 is not in operation. Thus, it is possible to prevent the permanent contraction of the elastic members 33 due to continuous compression by a high pressure, the elongation of the endless belt 81 of the belt 11, the permanent deformation of the pressure bearing members 82 and damaging of the component members. If the deterioration of the elastic members can be effectively suppressed by the displacement $L_{02}$, the displacement $L_{03}$ is unnecessary.

Even if a start instruction is given to the transmission 10 at time $t_1$, the driving device 9 gives a pressure application instruction, which is equivalent to a speed reducing instruction, to the first pressing device 5 in a start delaying period $T_{START}$ between times $t_1$ and $t_{11}$. In this state, the transmission 10 remains stopped, and the maximum pressure $P_{max}$ is applied to the elastic device 3 as indicated by the characteristic curve D in FIG. 6A in a pressure application mode. Upon the compression of the elastic device 3 in a normally compressed state at the time $t_{11}$, the switching controller 70 operates to set the transmission 10 for an ordinary variable-speed operating mode. When the transmission 10 is applied to a vehicle or the like, a pressure removal instruction for the release pressure changing mode may be given by operating the engine key switch or a speed change instruction may be given by an accelerating device.

(III) Shaft torque control mode: While the transmission is in operation, the shaft torque of the output shaft 50 is controlled by giving a pressure removal instruction only to the first pressing device 5 at time when the transmission is operating at an optional speed change ratio $\epsilon_c$ to control a predetermined compression value so that a frictional force of an optional magnitude is produced between the secondary pulley 1 and the belt 11. Particularly, when power is supplied by an internal combustion engine or the like, the rotating speed of the input shaft 20 varies even if the speed change ratio of the transmission 10 is fixed, in some cases, the variable adjustment of the shaft torque to be transmitted to a load according to the rotating speed is required. As shown in FIG. 1, an input speed measuring device 80 is disposed between a case 10d and the circumference of the disk 2b of the primary pulley 2. A magnet 80b is detected by a sensor 80a. A pressure application instruction is given to the secondary pulley 1 as the rotating speed decreases, and a pressure removal instruction is given to the secondary pulley 1 as the rotating speed increases. Thus, the instruction is a synchronizing signal. Optional torque control equivalent to torque control in the variable-speed operating mode is possible. The rotating speed of the output shaft 50 may be measured by a sensor 92 and the speed change ratio may be calculated. The shaft torque can be controlled in state where the transmission is set for an optional speed change ratio.

The pressure applied by the first pressing device 5 and the second pressing device 8' to the belt 11 is varied according to the operating mode, i.e., the operating mode (1), (II) or (III). IN the variable-speed operating mode (I) and the shaft torque control mode (III), shaft torque must be adjusted according to rotating speed for the secondary pulley 1. Required power for a load is determined by using foregoing Expression (1). Therefore, in the individual pressure application mode for applying pressure only to the secondary pulley 1, the rotating speed of the input shaft 20 may be measured by the rotating speed measuring device 80, a pressure application instruction may be given to the elastic device 3 to increase the pressure when the rotating speed of the input shaft 20 is low or a pressure removal instruction may be given to the elastic device 3 to reduce the pressure when the rotating speed of the input shaft 20 is high for operation in the shaft torque control mode. In such a case, the first pressing device 5 may be designed so that pressures $P'_{max}$ or $P'_{min}$ can be applied instead of applying the pressure $P_{max}$ or $P_{min}$ conforming the characteristic curve A shown in FIG. 6A, and a pressure application instruction and a pressure removal instruction stored in the storage device of the processor 91, storing instruction vs. pressure characteristics may be used for control.

The value of the pressure $P_0$ that is applied to the elastic members 33 while the transmission 10 is stopped in the pressure varying mode (II) is determined so that the elastic members 33 are scarcely contracted permanently or the permanent contraction of the elastic members 33 is negligibly small when the elastic members 33 are compressed for a long period of time. The value of the pressure $P_0$ is dependent on the quality of materials forming the elastic members 33, the magnitude of pressure, the transmission capacity of the transmission 10 and the like. Generally, the deterioration of the elastic members 33 can be avoided when the pressure $P_0$ is not higher than the pressure $P'_0$ to be applied to the elastic members 33 when the speed change ratio $\epsilon=1$ in the variable-speed operating mode (I). The term "substantial suppression of deformation and deterioration" used in claims signifies the avoidance of rapid permanent deformation or warping of a member when the member is loaded with a fixed high load for a long time. The permanent contraction of a compression coil spring is called permanent setting. The suppression of elongation of a belt loaded with a large load can be achieved by preventing the growth of deformation and deterioration that causes creep rupture. In this specification, a high-pressure-deteriorating member is the member that affect adversely to output torque and rotating speed, such as the elastic member, the belt or the secondary pulley. The mechanical damaging of the contact surfaces of the pulleys and the belt can be avoided in principle by the shock absorbing action of the elastic device 3.

Second Embodiment

FIG. 8 shows a pressure bearing member of a dry belt 11 employed in a belt pressing mechanism in a second embodiment according to the present invention. The pressure bearing member shown in FIG. 8 is substantially the same as that shown in FIG. 5 and hence portions of the former like or corresponding to those of the latter will be denoted by the same reference characters and the description thereof will be omitted. Only points where the pressure bearing member shown in FIG. 8 is different from the pressure bearing member shown in FIG. 5 will be described. The pressure bearing member 82 shown in FIG. 8 is capable of being elastically bent to absorb widthwise shocks when pressures exerted by pressing devices 5 and 8' are applied thereto by the disks 1a and 1b of the secondary pulley 1 and by the disks 2a and 2b of the primary pulley 2. Every time the belt 11 receives a speed change instruction between the disks 1a and 1b of the secondary pulley 1 or between the disks 2a and 2b of the primary pulley 2, the pressure bearing member 82 is loaded with an excessively large load and an instantaneous point-contact state is created. The pressure bearing member 82 bends elastically to avoid damaging the secondary pulley 1 or the primary pulley 2, and the belt 11 by a large load resulting from the instantaneous point-contact state. When some of the pressure bearing members 82 of the belt 11 is loaded with a very large load due to the creation of the point-contact state, the width of the loaded pressure bearing members 82 decreases instantaneously to distribute the large load to the adjacent pressure bearing members 82 and to distribute the load to the succeeding pressure bearing members 82 instantaneously according to the amount of the load as shown in FIGS. 8C and 8D. The disks of the secondary pulley 1 or the primary pulley 2 exerts a pressure on the pressure bearing member 82 at points $a_1$ and $b_1$ on the center line of the pressure receiving member 82. Then, as shown in FIGS. 8D-(i) and 8D-(ii), the width $l_0$ of the pressure bearing member 82 decreases to a width $l'_0$ by a reduction $2\beta$. The tip $c_0$ of a connecting part 89 shifts by a distance a to a position indicated at $c'_0$ in the direction of the length. Thus, the widthwise pressure applied to the pressure bearing member 82 is converted into a lengthwise pressure to press the adjacent pressure bearing member 82, so that a belt 81 is tensioned.

The shape of the connecting part 89 is different from that of the connecting part of the pressure bearing member 82 shown in FIG. 5. Whereas the connecting part 89 of the pressure bearing member 82 shown in FIG. 5 has the shape of a hinge, the connecting part 89 of the pressure bearing member 82 shown in FIG. 8 has a bent portion of a V- or U-shaped cross section defined by lines connecting points $a_2$, $b_2$ and $c_0$. As shown in FIG. 8, a projection 85a and a recess 85b are defined by flat portions. When the pressing device 5 applies a high pressure continuously on the elastic device 3 while the transmission 10 is stopped, the elastic members 33 and the base members 83 of light alloy, such as a titanium alloy or an aluminum alloy, or a ceramic material are strained and thereby the elasticity and shock absorbing ability of the belt 11 are deteriorated. The present invention prevents such deterioration.

Third Embodiment

Figure 9:
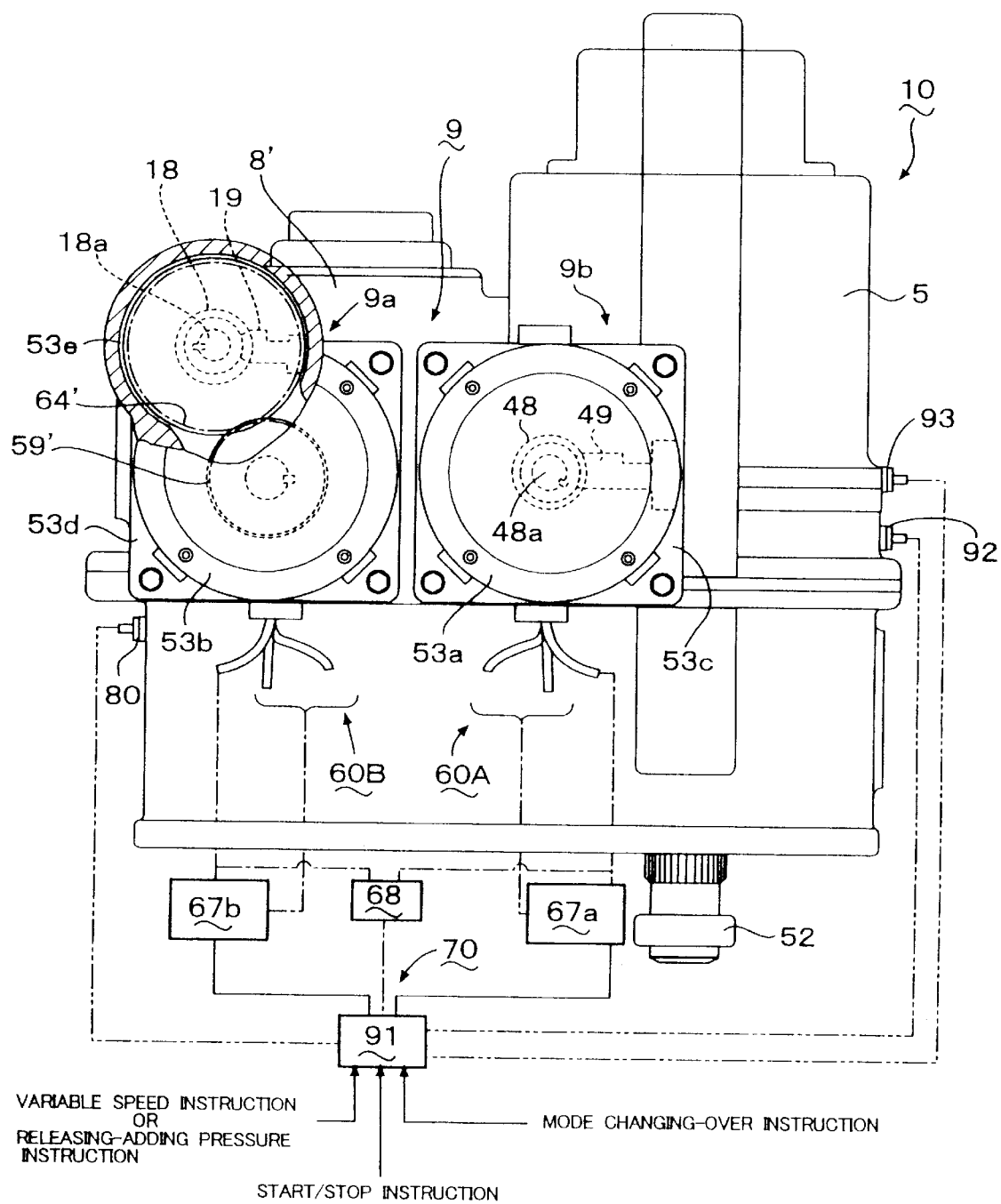
FIG. 9 is a front elevation of first and second pressure application controllers included in a third embodiment according to the present invention.

FIG. 9 shows a driving device 9 included in a belt pressing mechanism in a third embodiment according to the present invention. The driving device 9 has a reversible motor and an instruction controller. In the first embodiment shown in FIG. 3 and 4, the pressure application controllers 60A and 60B for applying pressure to the pressing devices 5 and 8' are driven by the driving device 9 having the single reversible motor 53. In the third embodiment, the first pressing device 5 and the second pressing device 8' are operated by reversible motors 53a and 53b of the same capacity included in driving devices 9a and 9b, respectively. The reversible motors 53a and 53b are connected to servo amplifiers 67a and 67b, respectively. A processor 91 controls the reversible motors 53a and 53b of the driving devices 9a and 9b through an I/O device 68. The processor 91 and the driving devices 9a and 9b exercise an electric switching control function to set the transmission in the individual pressure application mode or the variable-speed operating mode.

The reversible motors 53a and 53b need not be necessarily of the same capacity. Suppose that the pressing devices 5 and 8' are the same as those shown in FIGS. 1 and 2. Then, in the variable-speed operating mode, a displacement $L_0$ caused by the first compressing device 25 is about twice a displacement $L_1$ caused by the second compressing device 15 or greater than twice the same, and the first pressing device 5 and the second pressing device 8' must be turned synchronously in opposite directions, respectively. Therefore, a gear head 53d is provided additionally with a gear train 53e including gears 59' and 64'.

This embodiment is featured by applying pressure to the secondary pulley 1 having the two disks by compressing the elastic device 3 by the first pressing device 5 and controlling the pressure by the pressure application controller 60A for stable transmission. The operation of the transmission is not limited only to a variable-speed operation and the present invention is applicable to a transmission for a constant-ratio power transmission. The belt does not need to be limited to those of a compression type shown in FIGS. 5 and 8 and may be those of a tension type. The driving device 9 is not limited to the dc motor, and may be any suitable motor, such as an ac motor or a hydraulic motor. The control operation may be performed manually by operating a handle or automatically by a personal computer.

The idea of the present invention of simultaneously using the pressure of the elastic device and the elastic force corresponding to the pressure as an elastic pressure is effective in absorbing impact load vibrations caused by internal and external factors including errors and variations by an elastic force corresponding to the pressure at a speed change ratio. Thus, the transmission is able to restore a stable power transmitting condition automatically and instantaneously. Since the pressure bearing members of the belt are capable of elastically changing their width and of absorbing shocks. Therefore, the belt and the pulleys are not mechanically damaged by instantaneous shocks or gradually developed errors and its variations and are capable of automatically absorbing shocks. Accordingly, even if stable rotating speed of the output shaft and shaft torque include slight errors, the errors can be compensated for by simple measures to ensure stable power transmission.

The automatic aligning function of the elastic pressure and the variable elastic force have crucial meaning. Contact pressure between frictional surfaces, which becomes unstable when the pulley is operated by operating valves of a direct hydraulic driving system, does not become unstable. Since springs are not arranged simply side by side, response speed to the variation of pressure on frictional transmission surfaces is instantaneous and stationary, the application of elastic force corresponding to a speed change ratio is settled down instantaneously and elastic force is applied continuously, contact pressure on the frictional surfaces is smooth and continuous and pressure does not vary stepwise. An appropriate pressure is applied to the frictional transmission surface, there is not any factor that cause an unstable condition and the pulleys and the belt are not damaged even if the speed changing control is carried out rapidly. In addition to those measure based on principles, the present invention releases the elastic members and the belt from pressure stress while the transmission is not in use, uses the plurality of springs as the elastic members, cools the springs and employs the belt having elastically bendable pressure bearing members capable of bending when exposed to a pressure exceeding a maximum pressure $P_{max}$ that can be produced by the elastic members to maintain a stable large horsepower transmitting ability for a long period of time.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A belt pressing mechanism for a constant-horsepower continuously variable transmission comprising an input shaft, an output shaft, a variable-pitch primary pulley including movable and fixed disks mounted on said input shaft, a variable-pitch secondary pulley including movable and fixed disks mounted on said output shaft, an endless belt extended between said primary and said secondary pulley, and a pressing device for applying elastic pressure to said movable disk of said primary or said secondary pulley, said belt pressing mechanism comprising:

an elastic device having elastic members each having one end supported so as to transmit elastic vibrations and the other end supported so as not to transmit elastic vibrations;

a compressing device having a self-locking function that presses and moves at least one of said elastic members and/or said movable disk upon the reception of a speed change instruction or a pressure removal instruction;

said pressing device that applies an elastic pressure produced by compressing in series said elastic device by said compressing device to said movable disk relative to a body;

a driving means connected to said compressing device to apply pressure individually to said movable disk in a state for speed change or a state not for speed change; and a pressure application controller that gives a speed change instruction to said driving means to move said movable disk when speed is changed and gives a pressure removal instruction to said driving means when speed is not changed.

2. The belt pressing mechanism according to claim 1, wherein said pressing device has a synchronous instruction to vary rotating speed and torque of said secondary pulley in inverse proportion to each other or an individual instruction to remove pressure at all times.

3. The belt pressing mechanism according to claim 1, wherein said pressing device has first and second compressing devices individually having a self-locking function to apply pressure through said elastic members to said variable-pitch primary pulley or said variable-pitch secondary pulley and to apply pressure directly to said variable-pitch secondary pulley or said variable-pitch primary pulley.

4. The belt pressing mechanism according to claim 1, wherein said belt comprises an endless belt, and a plurality of pressure bearing members slidably and successively arranged and linked on said endless belt and each formed by coating a thin base member of a hard material with a coating member of a soft material, and said base member is elastic and is bendable when a widthwise pressure is applied thereto.

5. The belt pressing mechanism according to claim 1, wherein said belt comprises an endless belt, and a plurality of pressure bearing members slidably and successively arranged and linked on said endless belt and each having a longitudinal projection of a V-shaped cross section, and each pressure bearing member warps elastically so as to be longitudinally convex when widthwise pressure is applied thereto to absorb the widthwise pressure elastically.

6. The belt pressing mechanism according to claim 3, wherein said driving means drives said respective moving disks of said primary and said secondary pulley individually by a reversible motor for individual pressure application.

7. The belt pressing mechanism according to claim 3, wherein said driving means includes a selecting means for selecting a first transmission path connecting a single reversible motor to said movable disk of said primary pulley or a second transmission path connecting said reversible motor to said movable disk of said secondary pulley.

8. A belt pressing mechanism for a constant-horsepower continuously variable transmission comprising an input shaft, an output shaft, a variable-pitch primary pulley including movable and fixed disks mounted on said input shaft, a variable-pitch secondary pulley including movable and fixed disks mounted on said output shaft, an endless belt extended between said primary and said secondary pulley, and a pressing device for applying elastic pressure to said movable disk of said primary or said secondary pulley, said belt pressing mechanism comprising;

an elastic device having elastic members each having one end supported so as to transmit elastic vibrations and the other end supported so as not to transmit elastic vibrations;

a compressing device having a self-locking function that presses and moves at least one of said elastic members and said movable disk upon the reception of a speed change instruction or a pressure removal instruction;

said pressing device that applies an elastic pressure produced by compressing in series said elastic device by said compressing device to said movable disk relative to a body;

a driving means connected to said compressing device to apply pressure to said movable disk in a state for speed change or a state not for speed change; and a pressure application controller that controls the application of the elastic pressure to said movable disk so that a high-pressure state for frictional power transmission is set during an operating period and a low-pressure state necessary to suppress deformation and deterioration of said elastic members or said belt is set during a stopping period.

9. The belt pressing mechanism according to claim 8, wherein said pressure application controller gives a speed change or pressure removal instruction to said transmission to set said transmission in a low-pressure state immediately after the start of said transmission and in a power transmitting period immediately before the stop of said transmission and sets a high-pressure state after said transmission has been started.

10. The belt pressing mechanism according to claim 8, wherein said pressure application controller gives a pressure removal instruction to said transmission immediately before the start of operation and in a stopping period immediately after the stop of operation to set said elastic device in a low-pressure state.

11. A belt pressing mechanism for a constant-horsepower continuously variable transmission comprising an input shaft, an output shaft; a variable-pitch primary pulley including movable and fixed disks mounted on said input shaft, a variable-pitch secondary pulley including movable and fixed disks mounted on said output shaft, an endless belt extended between said primary and said secondary pulley, a first pressing device for applying an elastic pressure to one of said movable disks, and a second pressing device for applying nonelastic pressure to the other movable disk; said belt pressing mechanism comprising;

an elastic device having elastic members each having one end supported so as to transmit elastic vibrations and the other end supported so as not to transmit elastic vibrations;

a first compressing device having a self-locking function that presses and moves at least one of said elastic members and/or one of said movable disks upon the reception of a speed change instruction or a pressure removal instruction;

a second compressing device that has a self-locking function;

said first pressing device that applies an elastic pressure produced by compressing in series the elastic device by said first compressing device to one of said movable disk said second pressing device that applies a pressure exerted by said second compressing device to the other movable disk in response to a speed change instruction;

first and second pressure application controllers each having a driving means for synchronously or asynchronously driving said first and said second compressing device and an instruction transmitting path for transmitting instructions provided by an instruction controller; and a switching controller that makes both said movable disks operate in a variable-speed operating mode by a speed change instruction when synchronously pressing said primary and said secondary pulley or makes one of said movable disks operate in an individual pressure application mode by a pressure removal instruction when asynchronously pressing both said pulleys.

12. The belt pressing mechanism according to claim 11, wherein said switching controller has first and second driving means respectively for individually driving said first and said second pressing device, and said instruction controller executes electrical synchronous switching operation.

13. The belt pressing mechanism according to claim 11, wherein said switching controller has a clutch means placed in an instruction transmission path of said first or said second pressure application controller to execute a synchronous switching operation.

14. The belt pressing mechanism according to claim 11, wherein said first pressure application controller makes said individual pressure application mode carry out a release pressure change mode of variable pressure control in which a pressure removing mode sets a low-pressure application state while said transmission is not in operation and a pressure applying mode sets a high-pressure application state while said transmission is in operation.

15. The belt pressing mechanism according to claim 11, wherein said first pressure application controller makes an individual pressure application mode work on a shaft torque control mode for controlling said shaft torque of one of said movable disks for the variable-pressure control of said elastic device in response to a pressure removal instruction while said transmission is operating at a fixed speed change ratio.

16. The belt pressing mechanism according to claim 11, wherein said driving means is provided with a faulty signal transmission preventing means for preventing mutual interference of instruction signals between said first and said second compressing device.

17. The belt pressing mechanism according to claim 13, wherein said clutch means of said switching controller includes a gear moving device, synchronous gear operating device and an electromegnetic biasing device.

18. The belt pressing mechanism according to claim 15, wherein said first pressure application controller gives a pressure removal instruction that makes input or output rotating speed inversely proportional to output torque to said first pressing device.

19. A belt pressing mechanism for a constant-horsepower continuously variable transmission comprising an input shaft, an output shaft; a variable-pitch primary pulley including movable and fixed disks mounted on said input shaft, a variable-pitch secondary pulley including movable and fixed disks mounted on said output shaft, an endless belt extended between said primary and said secondary pulley, a first pressing device for applying an elastic pressure to one of said movable disks, and a second pressing device for applying non-elastic pressure to the other movable disk; said belt pressing mechanism comprising;

an elastic device having elastic members each having one end supported so as to transmit elastic vibrations and the other end supported so as not to transmit elastic vibrations;

a first compressing device;

a second compressing device that has a self-locking function;

said first pressing device that applies an elastic pressure produced by compressing in series said elastic device by said first compressing device continuously to one of said movable disks in response to a speed change instruction or a pressure removal instruction;

said second pressing device that applies a non-elastic pressure to said other movable disk in response to a speed change instruction;

first and second pressure application controllers that transmit instructions from a driving means and an instruction controller to said first and said second compressing device to drive said first and said second compressing device synchronously or asynchronously; and a switching controller that executes a synchronous switching operation to apply pressure synchronously to said disks in a variable-speed operating mode in response to a speed change instruction and to apply pressure asynchronously to the disks in an individual pressure application mode; and said first pressure application controller that gives said first pressing device a pressure removal instruction that makes said individual pressure application mode work on a shaft torque control mode in a period in which power transmission is executed or on a release pressure changing mode in a period in which power transmission is not executed when said switching controller is asynchronous.

20. The belt pressing mechanism according to claim 19, wherein both said pressure application controllers execute a control sequence to set said belt at a position for a maximum speed change ratio when a transmission stop instruction is given.

21. The belt pressing mechanism according to claim 19, wherein said first pressure application controller adjusts pressure acting on said elastic members at the stop of power transmission to an elastic pressure $P'_0$ for speed change ratio of 1 in variable-speed operation or below.

22. The belt pressing mechanism according to claim 19, wherein said first pressing device, said first compressing device displaces by a distance of the sum $L_{10}$ of a speed change displacement $L_{01}$ of one of said movable disks and a compression displacement $L_{02}$ of said elastic members.

23. The belt pressing mechanism according claim 19, wherein said constant-horsepower continuously variable transmission is an automotive transmission, and said pressure removal instruction for said release pressure change mode is given by operating a switch for starting and stopping an internal combustion engine.

24. The belt pressing mechanism according to claim 20, wherein both said pressure application controllers remove pressures acting on said elastic device and said belt in a pressure removal mode after the termination of a variable-speed operation mode of said control sequence.

25. The belt pressing mechanism according claim 22, wherein said first pressing device further enlarges a pressure removal displacement $L_{03}$ of said elastic members to reduce the pressure acting on said elastic members to a minimum pressure $P_{min}$ at a minimum speed ratio or below.

26. A belt pressing mechanism for a constant-horsepower continuously variable transmission comprising an input shaft, an output shaft; a variable-pitch primary pulley including movable and fixed disks mounted on said input shaft, a variable-pitch secondary pulley including movable and fixed disks mounted on said output shaft, an endless belt extended between said primary and said secondary pulley, a first pressing device for applying an elastic pressure to one of said movable disks, and a second pressing device for applying non-elastic pressure to the other movable disk; said belt pressing mechanism comprising;

an elastic device having elastic members each having one end supported so as to transmit elastic vibrations and the other end supported so as not to transmit elastic vibrations;

first and second compressing devices having respectively a self-locking function;

said first pressing device that applies an elastic pressure produced by compressing in series said elastic device by said first compressing device continuously to one of said movable disks in response to a speed change instruction or a pressure removal instruction;

said second pressing device that applies a non-elastic pressure to the other movable disk in response to a speed change instruction;

first and second pressure application controllers that transmit instructions from a driving means and an instruction controller to said first and said second compressing device to drive said first and said second compressing device synchronously or asynchronously; and said instruction controller having a processor that adds a compensation corresponding to a difference between a value of rotating speed of an output pulley or output friction force measured by a detector and a set rotating speed or a set friction force stored in a storage device to instructions to be given to said first and said second pressing device.

27. The belt pressing mechanism according to claim 26, wherein said instruction controller is provided with a pressure sensor supporting said elastic device on a body and disposed between said elastic device and said body to measure frictional force acting between said belt and one of said pulleys.

28. The belt pressing mechanism according to claim 26, wherein said instruction controller, said processor controls said first pressing devices in an open-loop or closed-loop servo control mode on the basis of rotating speed or frictional pressure measured by a pressure sensor.

29. The belt pressing mechanism according claim 27, wherein the instruction controller adds a compensation to a speed change or pressure removal instruction to compensate for the reduction of the pressure of the elastic device due to deterioration and gives only the instruction after compensation to said first pressing device.

30. The belt pressing mechanism according to claim 27, wherein said instruction controller subtracts a compensation from a speed change instruction and gives only the instruction after compensation synchronously to said second pressing device to compensate for a change in rotating speed of said output pulley due to deterioration.

31. A belt pressing mechanism for a continuously variable transmission comprising:

an input shaft;

an output shaft;

a variable-pitch primary pulley including movable and fixed disks mounted on said input shaft;

a variable-pitch secondary pulley including movable and fixed disks mounted on said output shaft;

an endless belt extended between said primary and said secondary pulley;

a first pressing device for applying an elastic pressure to one of said movable disks;

a second pressing device for applying non-elastic pressure to the other movable disk;

a controller that gives instructions indicating belt friction force and rotating speed to said first and said second pressing device;

an elastic device having an elastic member having one end supported so as to transmit elastic vibrations and the other end supported so as not to transmit elastic vibrations;

an elastic compressing device having a self-locking function to compress said elastic member and at least one of said movable disks in response to a control instruction;

said first pressing device that applies an elastic pressure produced by compressing said elastic device by said elastic compressing device to one of said movable disk;

said second pressing device that applied a pressure produced by a non-elastic compressing device having a self-locking function to the other movable disk in response to a control instruction;

driving means respectively having first and second transmission paths for transmitting control instructions for synchronously or asynchronously actuating said elastic and said non-elastic compressing device; and the controller that gives a constant-horsepower or constant-torque transmission synchronizing instruction to said two pressing devices when said two pressing devices are synchronous or gives an asynchronous instruction to said two pressing devices or an individual variable instruction only to one of said two pressing devices when said two pressing devices are asynchronous.

32. The belt pressing mechanism according to claim 31, wherein the controller stops giving instructions to said non-elastic compressing device and gives the individual variable pressing instruction only to said elastic compressing device to control the shaft torque of said secondary pulley for said transmission according to speed-change input power.

33. The belt pressing mechanism according to claim 31, wherein said controller gives respectively an instruction to set a maximum speed change ratio to said non-elastic compressing device and an instruction to set a minimum compression to said elastic compressing device simultaneously when giving a transmission stop instruction.

* * * * *